United States Patent
Zhao

(10) Patent No.: US 8,018,953 B1
(45) Date of Patent: Sep. 13, 2011

(54) ADAPTIVE, DETERMINISTIC ANT ROUTING APPROACH FOR UPDATING NETWORK ROUTING INFORMATION

(75) Inventor: Fuyong Zhao, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 10/645,255

(22) Filed: Aug. 20, 2003

(51) Int. Cl.
*H04L 12/28* (2006.01)
(52) U.S. Cl. ........................................ 370/400; 370/238
(58) Field of Classification Search .................. 370/389, 370/392, 395.2, 236, 238, 252, 400, 401, 370/410, 524
See application file for complete search history.

(56) References Cited

U.S. PATENT DOCUMENTS

| | | | |
|---|---|---|---|
| 5,805,072 A | 9/1998 | Kakemizu | |
| 6,084,858 A | 7/2000 | Matthews et al. | |
| 6,427,114 B1 | 7/2002 | Olsson | |
| 6,631,122 B1 | 10/2003 | Arunachalam et al. | |
| 6,738,387 B1 | 5/2004 | Lin et al. | |
| 6,768,739 B1 | 7/2004 | Kobayashi et al. | |
| 6,910,024 B2 | 6/2005 | Krishnamurthy et al. | |
| 6,973,057 B1 | 12/2005 | Forslow | |
| 7,047,316 B2 | 5/2006 | Iwata et al. | |
| 7,146,430 B2 | 12/2006 | Kobayashi | |
| 7,158,497 B2 | 1/2007 | Li et al. | |
| 7,257,563 B2 | 8/2007 | Shmulevich et al. | |
| 7,350,379 B2 | 4/2008 | Ueda et al. | |
| 7,369,766 B2 | 5/2008 | Bannister et al. | |
| 7,382,731 B1 | 6/2008 | Zhao et al. | |
| 7,406,539 B2 | 7/2008 | Baldonado et al. | |
| 7,496,680 B2 | 2/2009 | Canright | |
| 7,590,224 B1 | 9/2009 | Gorin et al. | |
| 2001/0000536 A1* | 4/2001 | Tarin ............................ 707/102 | |
| 2001/0034853 A1 | 10/2001 | Takatama et al. | |
| 2003/0026268 A1 | 2/2003 | Navas | |
| 2003/0072269 A1* | 4/2003 | Teruhi et al. ................... 370/252 | |
| 2003/0202468 A1 | 10/2003 | Cain et al. | |
| 2003/0202479 A1 | 10/2003 | Huang et al. | |
| 2003/0204616 A1 | 10/2003 | Billhartz et al. | |
| 2003/0217114 A1* | 11/2003 | Obara et al. ................... 709/214 | |
| 2004/0240414 A1 | 12/2004 | Fan et al. | |
| 2005/0128944 A1 | 6/2005 | Zhang et al. | |

OTHER PUBLICATIONS

Flex Cho Zhao, "ANTD: An adaptive, Deterministic Ant Routing Algorithm", Mar. 16, 2007.*
Apostolopoulos, et al., INTF RFC 2676 "QoS Routing Mechanisms and OSPF Extensions", Aug. 1999.*
J. Moy et al. IETF RFC 1247 "OSPF Version 2" Jul. 1991.*
Gianni di caro and Marco dorigo, "AntNet: Distributed Stigmergetic Control for Communications networks", Journal of Artificial Intelligence Resarch 9 (1998), Dec. 1998, p. 317-365.*

(Continued)

*Primary Examiner* — Jianye Wu
(74) *Attorney, Agent, or Firm* — Hickman Palermo Truong & Becker LLP

(57) ABSTRACT

An adaptive, deterministic approach for updating network routing information is disclosed. From among a set of routers, each of which is associated with an amount of time relative to a destination, the router that is associated with the lowest amount of time is selected. A "forward ant" data packet, which indicates the destination, is sent to the selected router. A "backward ant" data packet is received. The "backward ant" data packet indicates an amount of time taken for the "forward ant" data packet to travel to the destination. Based on this amount of time, the amount of time that is associated with the selected router is updated. Based on information contained in the "backward ant" data packet, the routing table is updated.

38 Claims, 14 Drawing Sheets

OTHER PUBLICATIONS

S. Murphy, et al., "OSPF with Digital Signature," Jun. 1997, Network Working Group, Request for Comments: 2154, http://www.ietf.org/rfc/rfc2154.txt?number=2154, data retrieved Dec. 8, 2003, pp. 1-28.

David L. Mills, "Network Time Protocol (Version 3), Specification, Implementation and Analysis," Mar. 1992, Network Working Group, Request for Comments: 1305, http://www.ietf.org/rfc/rfc1305.txt?number=1305, data retrieved Dec. 8, 2003, pp. 1-107.

Y. Rekhter, et al., "A Border Gateway Protocol 4 (BGP-4)," Mar. 1995, Network Working Group, Request for Comments: 1771, http://www.ietf.org/rfc/rfc1771.txt?number=1771, data retrieved Jun. 5, 2003, pp. 1-54.

Gianni Di Caro, et al., "AntNet: Distributed Stigmergetic Control for Communications Networks," Journal of Artifical Intelligence Research 9, submitted May 1998, published Dec. 1998, pp. 317-365.

Marco Dorigo, et al., "The Ant System: Optimization by a colony of cooperating agents," IEEE Transactions on Systems, Man, and Cybernetics-Part B, vol. 26, No. 1, 1996, pp. 1-26.

Ruud Schoonderwoerd, et al., "Ant-Based load balancing in telecommunications networks," undated, pp. 1-26.

Felix Cho Zhao, Cisco Systems, Inc., "ANTD: An Adaptive, Deterministic Ant Routing Algorithm," 2003, Document No. EDCS-255496, pp. 1-38.

Eric Bonabeau, et al., "Swarm Smarts," Scientific American, Mar. 2000, pp. 72-79.

Dimitri Bertsekas, et al., "Data Networks," Prentice Hall, 1992, pp. 365-369 and 393-400.

Andrew S. Tanenbaum, "Computer Networks," Second Edition, Prentice Hall, 1996, pp. 345-365.

Malvin H. Kalos, et al., "Monte Carol Methods, vol. I: Basics," 1986, pp. 1-3 and 129-140.

Richard Bellman, "Dynamic Programming," Princeton University Press, Princeton, NJ, 1957, 362 pages.

C. Hedrick, "Routing Information Protocol," Jun. 1998, Network Working Group, Request for Comments: 1058, http://www.ietf.org/rfc/rfc1058.txt?number=1058, data retrieved Jan. 14, 2004, pp. 1-31.

J. Moy, "OSPF Version 2," Jul. 1991, Network Working Group, Request for Comments: 1247, http://www.ietf.org/rfc/rfc1247.txt?number=1247, data retrieved Jan. 14, 2004, pp. 1-76.

Bruce Davie, et al., "MPLS Technology and Applications," Morgan Kaufamann Publishers, 2000, 301 pages.

E. Crawley, et al., "A Framework for QoS-based Routing in the Internet," Aug. 1998, Network Working Group, Request for Comments: 2386, http://www.ietf.org/rfc/rfc2386.txt?number=2386, data retrieved Jan. 14, 2004, pp. 1-35.

G. Apostolopoulus, et al., "QoS Routing Mechanisms and OSPF Extensions," Aug. 1999, Network Working Group, Request for Comments: 2676, http://www.ietf.org/rfc/rfc2676.txt?number=2676, data retrieved Jan. 14, 2004, pp. 1-47.

J. Moy, "OSPF Version 2," Jul. 1997, Network Working Group, Request for Comments: 2178, http://www.ietf.org/rfc/rfc2178.txt?number=2178, data retrieved Dec. 8, 2003, pp. 1-197.

Shigang Chen, et al., "Distributed Quality of Service Routing in High-Speed Networks Based on Selective Routing," IEEE, 1998, pp. 80-89.

Kang G. Shin, et al., "Distributed Route Selection for Establishing Real-Time Channels," Aug. 30, 1999, pp. 1-29.

Hussein F. Salama, et al., "A Distributed Algorithm for Delay-Constrained Unicast Routing," IEEE, 1997, 8 pages.

Shigang Chen, et al., "An Overview of Quality-of-Service Routing for the Next Generation High Speed Networks: Problems and Solutions," pp. 1-19.

O. deSouza, et al.; "Guidelines for Running OSPF Over Frame Relay Networks"; AT&T Bell Laboratories; Network Working Group; Mar. 1994; 6 pages.

\* cited by examiner

ADAPTIVE, DETERMINISTIC ANT ROUTING APPROACH FOR UPDATING NETWORK ROUTING INFORMATION

RELATED APPLICATIONS

The present application is related to the following U.S. Patent Application, the entire contents of which are incorporated herein by reference for all purposes: U.S. patent application Ser. No. 10/382,639, filed on Mar. 5, 2003, entitled METHOD AND APPARATUS FOR UPDATING PROBABILISTIC NETWORK ROUTING INFORMATION, by Fuyong Zhao and Bruce Moon.

FIELD OF THE INVENTION

The present invention generally relates to routing algorithms for computer networks. The invention relates more specifically to an adaptive, deterministic ant routing approach for updating network routing information.

BACKGROUND OF THE INVENTION

The approaches described in this section could be pursued, but are not necessarily approaches that previously have been conceived or pursued. Therefore, unless otherwise indicated herein, the approaches described in this section are not prior art to the claims in this application and are not admitted to be prior art by inclusion in this section.

Computers may communicate with each other through a network by sending data packets to each other. While there are numerous protocols according to which one computer may address a data packet to another computer, a protocol commonly used for this purpose is Internet Protocol (IP). Typically, a data packet that is structured according to IP (an "IP data packet") contains a source IP address and a destination IP address. By examining a destination IP address contained in an IP data packet, a network device can determine the identity of a computer to which the IP data packet ultimately should be transmitted.

The computer that originates an IP data packet (the "originating computer") is often not directly connected to the computer for which the IP data packet is destined (the "destination computer"). The originating computer and the destination computer often transmit IP data packets through several interconnected intermediate network devices, such as network routers. Each router maintains a routing table that contains information that the router uses to select one of potentially several directly connected network devices to which the router should forward an IP data packet. Because each such directly connected network device is connected to a router port, the router selects one of potentially several ports through which to forward the packet.

By communicating the information in their routing tables to other routers and updating their routing tables based on information received from other routers, routers can attempt to "learn" from each other the network routes, or paths, from different sources to different destinations. Routers communicate such routing table information using a routing protocol. Some examples of routing protocols are distance vector protocols, such as Routing Information Protocol (RIP), and link state protocols, such as Open Shortest Path First (OSPF) protocol. RIP is described in the Internet Engineering Task Force (IETF) Request For Comments (RFC) 1058. OSPF is described in IETF RFC 1247.

Di Caro, G. and Dorigo, M. (1998) "Ant Net: Distributed Stigmergetic Control for Communications Networks," *Journal of Artificial Intelligence Research (JAIR)*, 9:317-365, describes a theoretical probabilistic routing approach. This "Ant Net" approach is modeled after the behavior of ants, which determine a best path to a destination by stochastically selecting between paths based on pheromones deposited on such paths by other ants. As more ants follow a particular path, more pheromones are deposited on the particular path relative to other paths. Because shorter paths tend to be traversed more quickly, shorter paths tend to accumulate more pheromone than longer paths. As more pheromones are deposited on a particular path, more ants are likely to select the particular path over other paths. However, because the ants' behavior is probabilistic, there is always a chance that an ant may select a path other than the path on which the most pheromones have been deposited, thus increasing the probability that other ants will also select that other path.

By incorporating a similar element of chance, probabilistic routing approaches have some advantages over distance vector protocols and link state protocols. Distance vector protocols and link state protocols do not provide for alternative paths between an originating computer and a destination computer. As a result, these protocols route all traffic between an originating computer and a destination computer over the same path, even when the traffic load on that path is high, and even when other unused paths between the originating computer and the destination computer are available. In contrast, probabilistic routing approaches may send portions of such traffic over multiple different paths, thereby balancing the traffic load over the paths.

Probabilistic routing approaches also recover more quickly from link failures. Because distance vector protocols and link state protocols only provide for one path between an originating computer and a destination computer at a time, the failure of a link on that path causes significant delay while these protocols attempt to re-route the traffic that formerly passed through the failed link. In contrast, probabilistic routing approaches quickly adapt to link failures as the use of alternative paths is reinforced and the continued use of broken paths is undermined.

When a new and better path between a source computer and a destination computer becomes available, probabilistic routing approaches tend to discover and make use of the new path. In contrast, distance vector protocols and link state protocols tend to ignore new paths in favor of established paths, even when the new paths are better than the established paths.

However, there are a few drawbacks to probabilistic routing approaches. When the load on a best path between an originating computer and a destination computer is low, there is little benefit in sending traffic over alternative paths. Indeed, concurrently sending portions of traffic over multiple different paths may cause packets to arrive at a destination computer out of order, which can require re-transmission of packets. Additionally, previous probabilistic routing approaches could not guarantee that paths would be loop-free.

Based on the foregoing, there is a clear need for a method of updating network routing information so that data packets are routed in a manner that lacks the disadvantages inherent in distance vector protocols, link state protocols, and probabilistic routing approaches.

More specifically, there is a need for a method of updating network routing information so that data packets are routed in a manner that does not always restrict traffic to a single path, and in a manner that reduces the routing of traffic over suboptimal paths.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
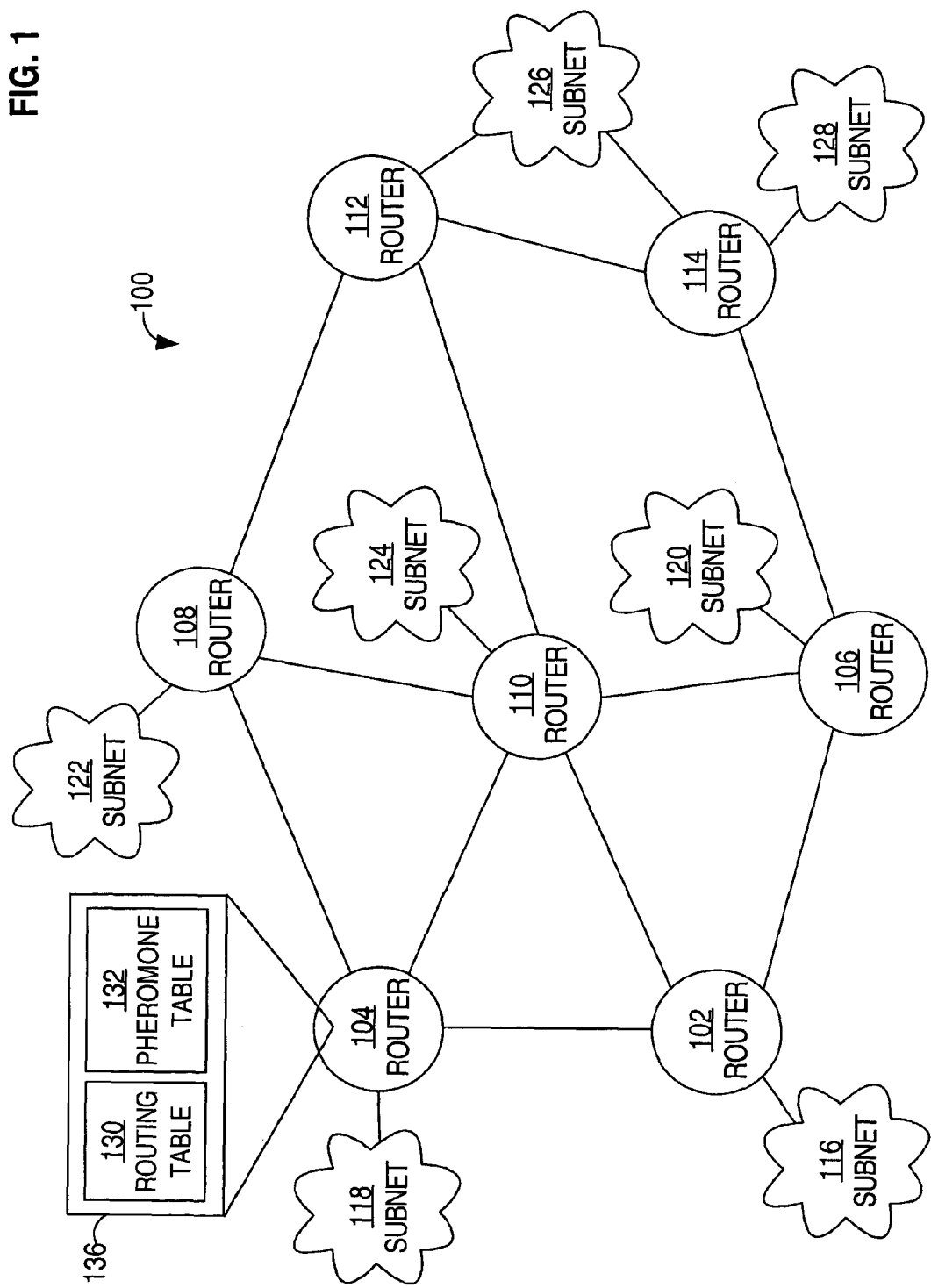
FIG. 1 is a block diagram that illustrates an overview of an example system that may be used to practice a method of updating a routing table based on an adaptive, deterministic ant routing algorithm.

An adaptive, deterministic ant routing approach for updating network routing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0      General Overview
     1.1      Exploring Paths With Forward Ants
     1.2      Updating Routing Information With Backward Ants
2.0      Structural and Functional Overview
3.0      Method of Updating Network Routing Information Based On an Adaptive, Deterministic Ant Routing Algorithm
     3.1      Exploring Paths and Updating Routing Information
     3.2      Associating Subnets With Destination Routers
     3.3      Determining Neighbor Routers
     3.4      Detecting and Responding to Link Failures and Router Removals
     3.5      Associating a Subnet With a Virtual Destination Router
     3.6      Advertising External Routes
4.0      Implementation Mechanisms-Hardware Overview
5.0      Extensions and Alternatives

1.0 General Overview

The needs identified in the foregoing Background, and other needs and objects that will become apparent from the following description, are achieved in the present invention, which comprises, in one aspect, a method of updating a routing table based on an adaptive, deterministic ant routing algorithm.

1.1 Exploring Paths with Forward Ants

According to one aspect of the method, each router in a network periodically sends "forward ant" data packets ("forward ants") through each of that router's network interfaces. Each forward ant indicates (a) a destination, (b) the identity of the router that sent that forward ant, (c) a timestamp, and (d) a "loop-avoidance router" field that initially is set to NULL.

When a neighboring router receives a forward ant, the neighboring router inserts the forward ant into a queue. Because forward ants share the same queues as other data packets, forward ants experience the same delays as other data packets.

Each router executes a routing process that updates forward ants received by that router. A router's routing process inserts, into a forward ant, (a) the router's identity, and (b) a timestamp. As a forward ant is sent from router to router, the forward ant accumulates information that indicates (a) the identities of the routers that the forward ant has visited, and (b) the time taken for the forward ant to traverse all routers that the forward ant has visited.

A router that has just received a forward ant may be called the "present" router relative to the forward ant. If the present router is not the forward ant's indicated destination ("the destination"), then, after updating the forward ant, the present router determines a "next hop" for the forward ant. However, the present router does not determine the next hop for the forward ant based on the present router's routing table. Instead, the present router determines the next hop for the forward ant based on the present router's "pheromone table."

In addition to other information, the present router's pheromone table indicates, for each possible destination d and each of the present router's neighboring routers k, a predicted amount of time that will pass between the sending of a data packet toward neighbor router k and the arrival of that data packet at destination d. Initially, each predicted amount of time is set to some specified maximum value that represents infinity.

To avoid sending the forward ant to a neighboring router that the forward ant has already visited, the present router excludes, from a prospective set of the present router's neighboring routers, all neighboring routers that the forward ant has already visited. As described above, the forward ant indicates every router that the forward ant has already visited. The present router selects a next hop for the forward ant from the exclusive set of neighbor routers that the forward ant has not yet visited. As a result, paths will not contain loops.

From the exclusive set, the present router selects the neighbor router that is associated with the lowest predicted time to reach the destination. The selection is analogous to a real ant's selection of a path associated with the greatest pheromone intensity. The selection is deterministic rather than probabilistic. If there are no neighbor routers in the exclusive set, or if the lowest predicted time is equal to the value that represents infinity, then the present router does not send the forward ant to a neighbor router. In that case, the present router terminates the forward ant.

Otherwise, the present router selects a neighbor router to be the next hop for the forward ant. Because only neighbor routers in the exclusive set can be selected, the selected neighbor router might not be the neighbor router associated with the lowest predicted time to reach the destination. If the selected neighbor router is not associated with the lowest predicted time to reach the destination, then the present router updates the forward ant's loop-avoidance router field to indicate the present router's identity. Regardless of whether the present router updates the loop-avoidance router field, the present router sends the forward ant to the selected neighbor router. Thus, the forward ant is sent from router to router towards the destination. Each router along the path updates the information carried by the forward ant.

1.2 Updating Routing Information with Backward Ants

If the present router is the destination, then the present router does not send the forward ant to a neighboring router. Instead, the present router generates a corresponding "backward ant" data packet ("backward ant") and copies the information contained in the forward ant into the backward ant. In addition to this information, the backward ant indicates (a) a path feasibility flag that initially is set to a value that represents feasibility and (b) a specified expiration time. For example, the specified expiration time may be equal to the sum of the current time and a product of a constant value and the time taken for the corresponding forward ant to reach the destination. The present router sends the backward ant to the neighbor router from which the present router received the corresponding forward ant.

A router that has just received a backward ant may be called the "present" router relative to the backward ant. The present router determines, based on the backward ant's expiration time, whether the backward ant has expired. If the backward ant has expired, then, instead of updating the present router's pheromone and routing tables, the present router eliminates the backward ant. In this case, the backward ant's information is deemed to be stale.

If the backward ant has not expired, then the present router updates the present router's pheromone table based on information carried by the backward ant. The router from which the present router received the backward ant may be called the "previous router" relative to the backward ant. The pheromone table may indicate both "primary" and "alternative" paths from the present router, through the "previous router," to the destination. Pheromone table information associated with either the primary path or the alternative path is updated. From the path information carried by the backward ant, the present router determines whether the present router, the destination, or any router in the path between the present router and the destination matches a router indicated in the backward ant's loop-avoidance router field. As described above, this field was copied from the corresponding forward ant. If there is not a match, then the pheromone table information associated with the primary path is updated. If there is a match, then the pheromone table information associated with the alternative path is updated instead.

Based on the timestamps contained in the backward ant, the present router updates the pheromone table information to indicate a predicted amount of time that will pass between (a) the sending of a data packet to the "previous router" and (b) the arrival of that data packet at the destination.

Based on the value of the path feasibility flag indicated by the backward ant, the present router updates the pheromone table information to indicate whether the corresponding forward ant's path from the present router to the destination is feasible.

The present router also updates, in the pheromone table information, a "potential upstream node list." The potential upstream node list may indicate one or more routers, each of which is associated with a separate expiration time. Routers found along the corresponding forward ant's path towards the present router may be called "potential upstream nodes" relative to the present router. If any of the potential upstream nodes are not already in the potential upstream node list, then the present router adds those potential upstream nodes to the potential upstream node list. The present router associates, with each potential upstream node indicated by the backward ant, an expiration time that is equal to the backward ant's expiration time. Any of the other potential upstream nodes that have expired are removed from the potential upstream node list.

The present router determines from the backward ant if the time taken by the corresponding forward ant to reach the destination through the previous router is the lowest of the pheromone table's predicted times to reach the destination through any of the present router's neighboring routers. If so, then the present router also determines if the backward ant's path feasibility flag indicates that the corresponding forward ant's path is feasible. If so, then the present router further determines if any of the routers along the corresponding forward ant's path between and including the present router and the destination are identified in the potential upstream node list associated with the destination. If not, then the present router updates the present router's routing table to indicate that data packets addressed to the destination are to be forwarded to the previous router. The satisfaction of the above conditions prior to the updating of the routing table guarantees that paths based on the routing table are optimal and loop-free.

The present router's routing table indicates a neighbor router to which data packets addressed to the destination are to be sent. The present router determines if this neighbor router is the "previous router." If not, then the present router updates the value of the backward ant's path feasibility flag to indicate that the path traveled by the corresponding forward ant is not feasible. This is possible because the routing table and the pheromone table, which guides the exploration of forward ants, sometimes disagree. For example, a routing table and a pheromone table may disagree during convergence.

If the present router did not generate the corresponding forward ant, the present router determines a next hop for the backward ant. However, the present router does not determine the next hop for the backward ant based on the present router's pheromone or routing tables. Instead, the present router determines the next hop for the backward ant based on the reverse of the corresponding forward ant's path. From the path information copied into the backward ant, the present router determines which of the present router's neighbor routers sent the corresponding forward ant to the present router. The present router sends the backward ant to that neighbor router. Thus, the backward ant is sent from router to router backwards along the corresponding forward ant's path, until the backward ant reaches the router that generated the forward ant. Each router along the path may update pheromone and routing tables based on the information carried by the backward ant. Each router along the path may update the information carried by the backward ant.

The updating of the pheromone and routing tables based on information indicated by the backward ant is analogous to the way a real ant deposits pheromone along a return path. Subsequent forward ants travel paths based on pheromone tables updated based on the backward ant's information. However, when pheromone tables are updated, a given path might be weakened rather than reinforced.

Because pheromone tables may indicate both primary and alternative paths between a given router and a given destination, traffic may be sent exclusively over an optimal primary path when the traffic load on the primary path is sufficiently low, and traffic may be split and balanced between primary and alternative paths when the traffic load on the primary path is sufficiently high. Unlike previous approaches, the method described above allows data packets to be routed in a manner that does not always restrict traffic to a single path, and in a manner that reduces the routing of traffic over suboptimal paths.

In other aspects, the invention encompasses a computer apparatus and a computer-readable medium configured to carry out the foregoing method.

2.0 Structural and Functional Overview

FIG. 1 is a block diagram that illustrates an overview of an example system that may be used to practice a method of updating a routing table based on an adaptive, deterministic ant routing algorithm. A network 100 comprises routers 102-114. Any of subnets 116-128 may be a subnet of network 100 (an "internal subnet"), or a subnet of a network external to network 100 (an "external subnet"). The system shown is merely an example of many possible different configurations. Other embodiments may include fewer or more system components than those illustrated.

Router 102 is coupled communicatively to subnet 116 and routers 104, 106, and 110. Router 104 is also coupled communicatively to subnet 118 and routers 108 and 110. Router 106 is further coupled communicatively to subnet 120 and routers 110 and 114. Router 108 is also coupled communicatively to subnet 122 and routers 110 and 112. Router 110 is further coupled communicatively to subnet 124 and router 112. Router 112 is also coupled communicatively to subnet 126 and router 114. Router 114 is further coupled communicatively to subnets 126 and 128. Routers that are directly coupled to each other are "neighbor routers."

Each of routers 102-114 maintains separate routing information. When a router receives a data packet that is destined for a network address to which the router is not directly connected, the router consults the routing information to select a next router to which the router will forward the data packet. For example, router 104 maintains routing information 136 that comprises a routing table 130 and a pheromone table 132. Others of routers 102-114 also each separately maintain a routing table and a pheromone table.

Routing table 130 contains one or more entries. Each entry identifies a destination network, a destination router ID that is associated with the destination network, and a next hop that is associated with the destination router ID.

The destination network identifies a range of destination network addresses. For example, the destination network may be an IP network, an IP subnet, an IP supernet, or a single IP host. The destination network may identify a range of destination network addresses by specifying an address mask, such as a subnet mask, in addition to a network address.

The destination router ID uniquely identifies a router within an autonomous system. For example, the router ID may be a 32-bit number. According to one embodiment, the router identified by the destination router ID may be a virtual router rather than an actual router. Virtual routers are described in greater detail below.

The next hop indicates an outgoing port that a router should use when forwarding data packets to a destination network address contained in the destination network. In broadcast, point-to-multipoint, and non-broadcast multi-access ("NBMA") networks, the next hop indicates a network address of a next router in a route to the destination network address.

For each destination router d other than router 104 in network 100, and for each "neighbor" router k that is directly connected to router 104, pheromone table 132 contains a separate entry that comprises the following primary path information, where router 104 is router i:

$T^k_{di}$: an amount of time taken by the forward ant that most recently traveled the path from router i, through neighbor router k, to destination router d.

$PATH^k_{di}$: a path taken by the forward ant that most recently traveled the path from router i, through neighbor router k, to destination router d. The path comprises a list of all of the routers along the path, in the order in which those routers were visited.

$P^k_{di}$: a pheromone intensity associated with the link between router i and neighbor router k. The pheromone intensity may be calculated as $C/T^k_{di}$, where C is a positive constant value.

$BW^k_{di}$: an available bandwidth of the "bottleneck" link in $PATH^k_{di}$. The "bottleneck" link in a path is the link that has the least available bandwidth of any link in that path.

$F^k_{di}$: a path feasibility flag that indicates whether it is feasible to send data packets destined for destination router d through neighbor router k.

$PUN_{di}$: a potential upstream node list that temporarily indicates routers that are potentially "upstream" of router i along a path towards router d, as indicated by one or more backward ants that have visited router i.

Expiration times associated with $PATH^k_{di}$ and routers in $PUN_{di}$.

Additionally, for each destination router d and each "neighbor" router k, pheromone table 132 may contain one or more separate entries that each comprise similar information regarding alternative paths from router i, through neighbor router k, to destination router d.

Each entry in the pheromone table is associated with an expiration time that is renewed as ants return over the path associated with the entry. When the expiration time associated with an entry has passed, the entry is removed from the pheromone table. Thus, if ants stop returning over a path, the entry corresponding to that path expires and is removed from the pheromone table.

According to one embodiment, one or more of the entries in the pheromone table described above may be associated with virtual destination routers rather than actual destination routers. Virtual routers are described further below.

Forward ants and backward ants are used to explore the best network routes from one router to another router. Because each network address in a network is contained in a subnet that is associated with a router, a network route between any pair of network addresses can be derived from information about routes between each pair of routers in a network. Because routers typically comprise just a fraction of all the devices in a network, maintaining routing information for network routes between routers is more practical than separately specifying routing information for each pair of devices in a network.

According to one embodiment, at regular intervals, each one of routers 102-114 asynchronously launches, through each of that router's network interfaces, a forward ant that is addressed to a selected destination router. The destination router may be selected, for example, according to a round-robin scheme, with each router in network 100 being selected in turn. The destination router may be an actual router or a virtual router. Forward ants share the same router queues as non-ant data packets, so forward ants experience the same network conditions that other data packets experience.

Each forward ant is transmitted through one or more routers towards its destination. In response to receiving a forward ant, a router updates the forward ant, as described above in section 1.1. After updating the forward ant, the router selects a next hop for the forward ant based on the router's pheromone table, and sends the forward ant to the neighbor router selected to be the next hop, as described above.

As described above, when a destination router specified by the forward ant receives the forward ant, the destination router generates a corresponding backward ant. The destination router stores the forward ant's information in the backward ant, and eliminates the forward ant. Based on the forward ant's information, the backward ant is transmitted through the same one or more routers through which the forward ant was transmitted, but in the reverse order.

As described above in section 1.2, in response to receiving a backward ant, a router may update its routing information, such as that router's pheromone and routing tables, based on the forward ant's information that is stored in the backward ant. As described above, the router may update additional information, such as a path feasibility flag, that is stored in the backward ant. As a result, routing information is updated for each router in a network route through which the forward ant was transmitted.

Figure 2A:
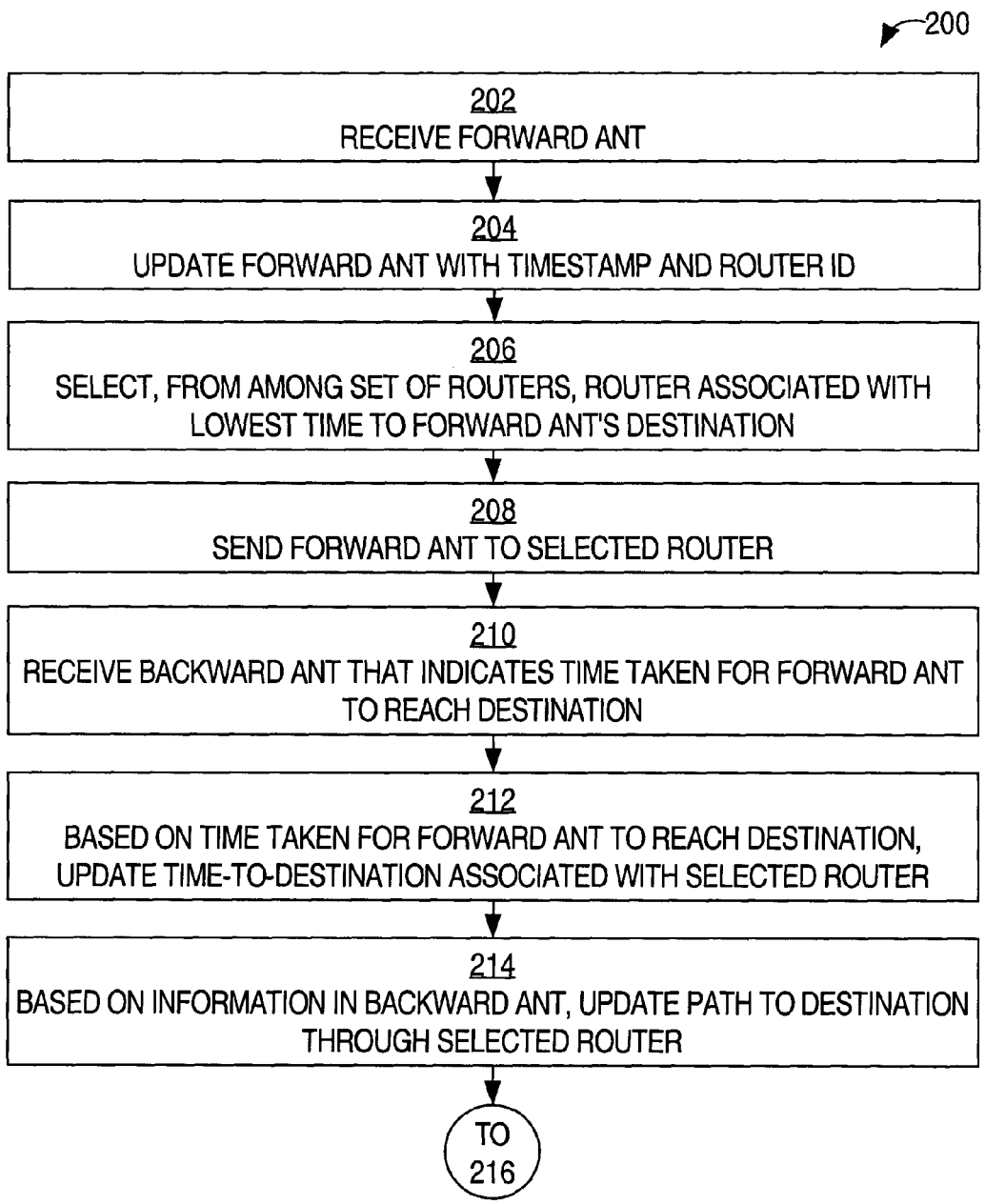
FIGS. 2A and 2B are flow diagrams that illustrate a high level overview of one embodiment of a method of updating a routing table based on an adaptive, deterministic ant routing algorithm.
Figure 2B:
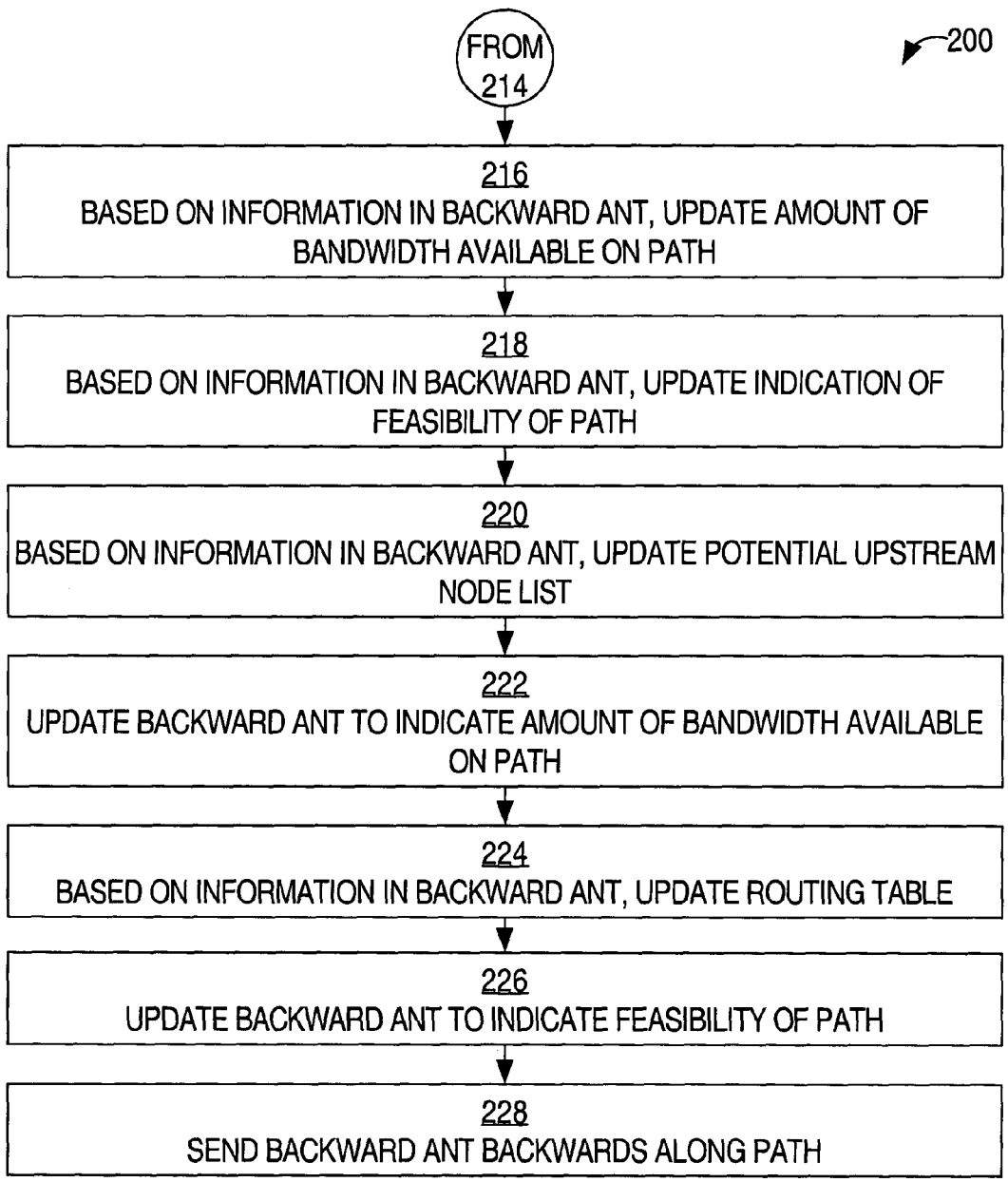
Figure 3A:
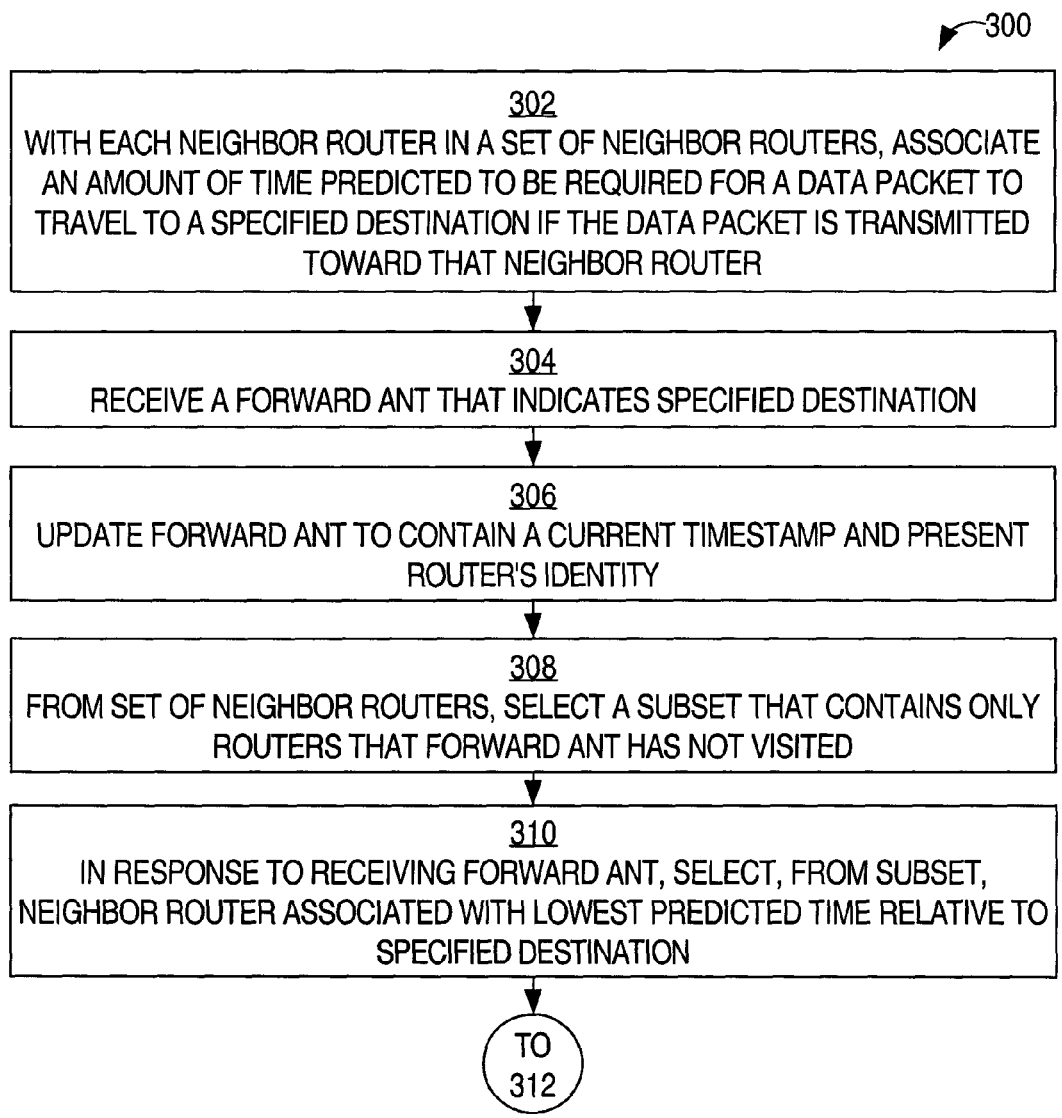
FIGS. 3A, 3B, 3C, 3D, and 3E are flow diagrams that illustrate one embodiment of a method of updating a routing table based on an adaptive, deterministic ant routing algorithm.
Figure 3B:
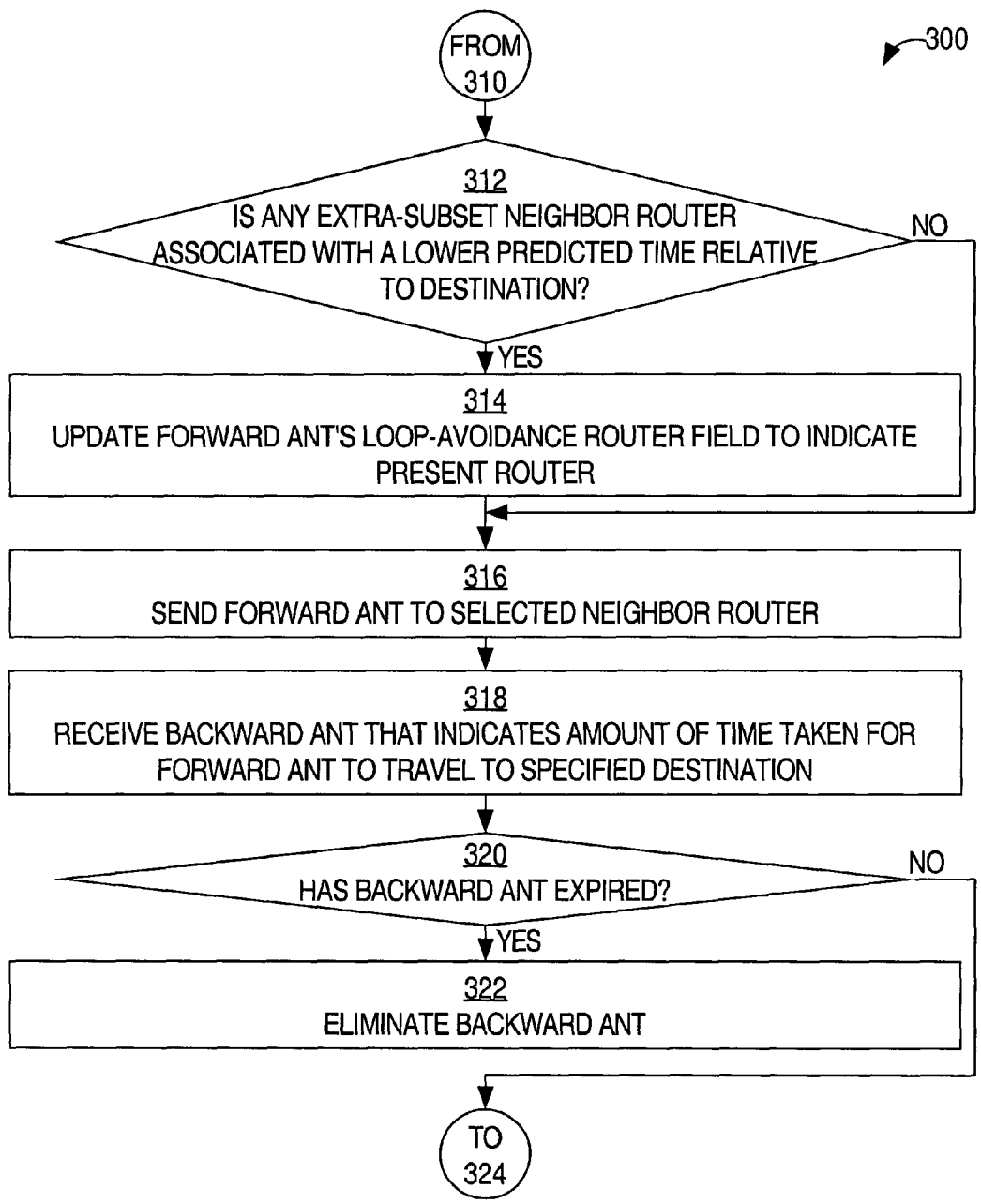
Figure 3C:
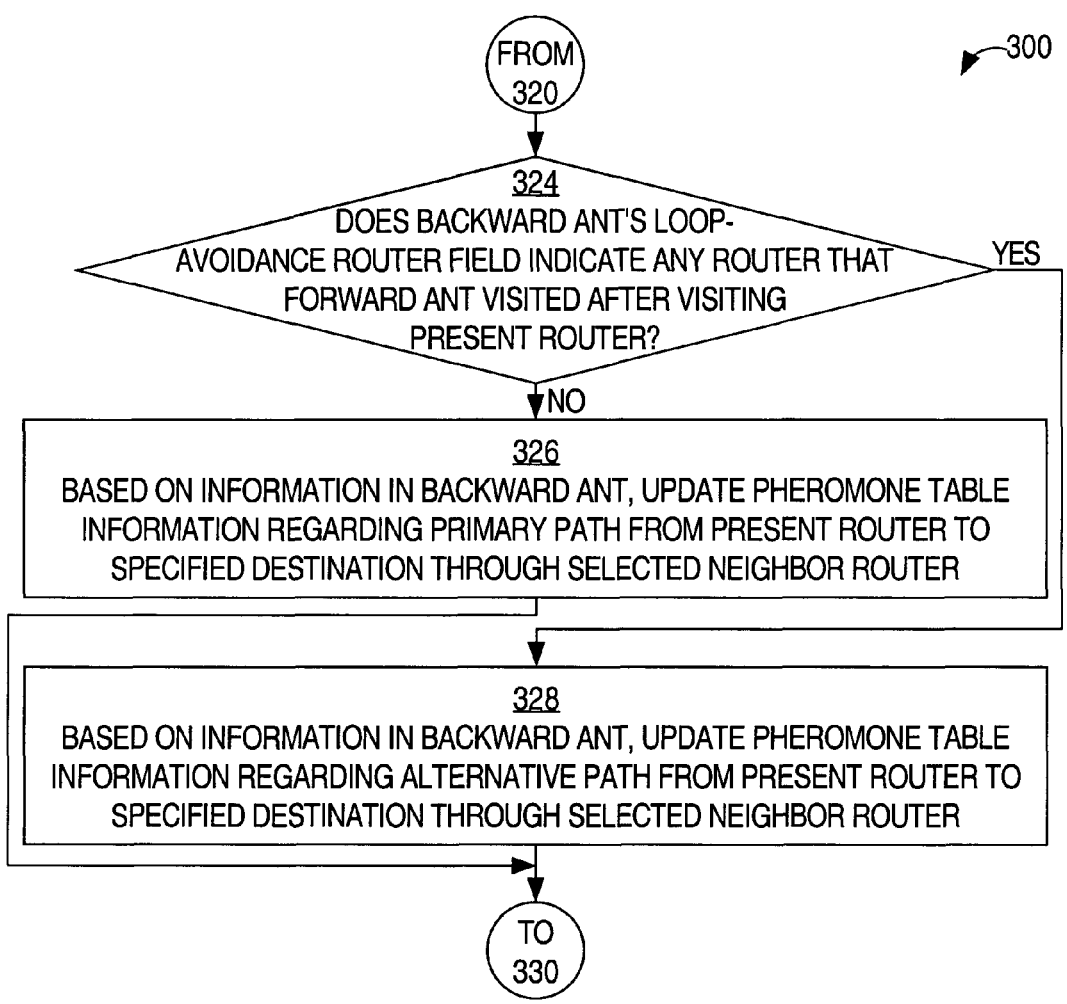
Figure 3D:
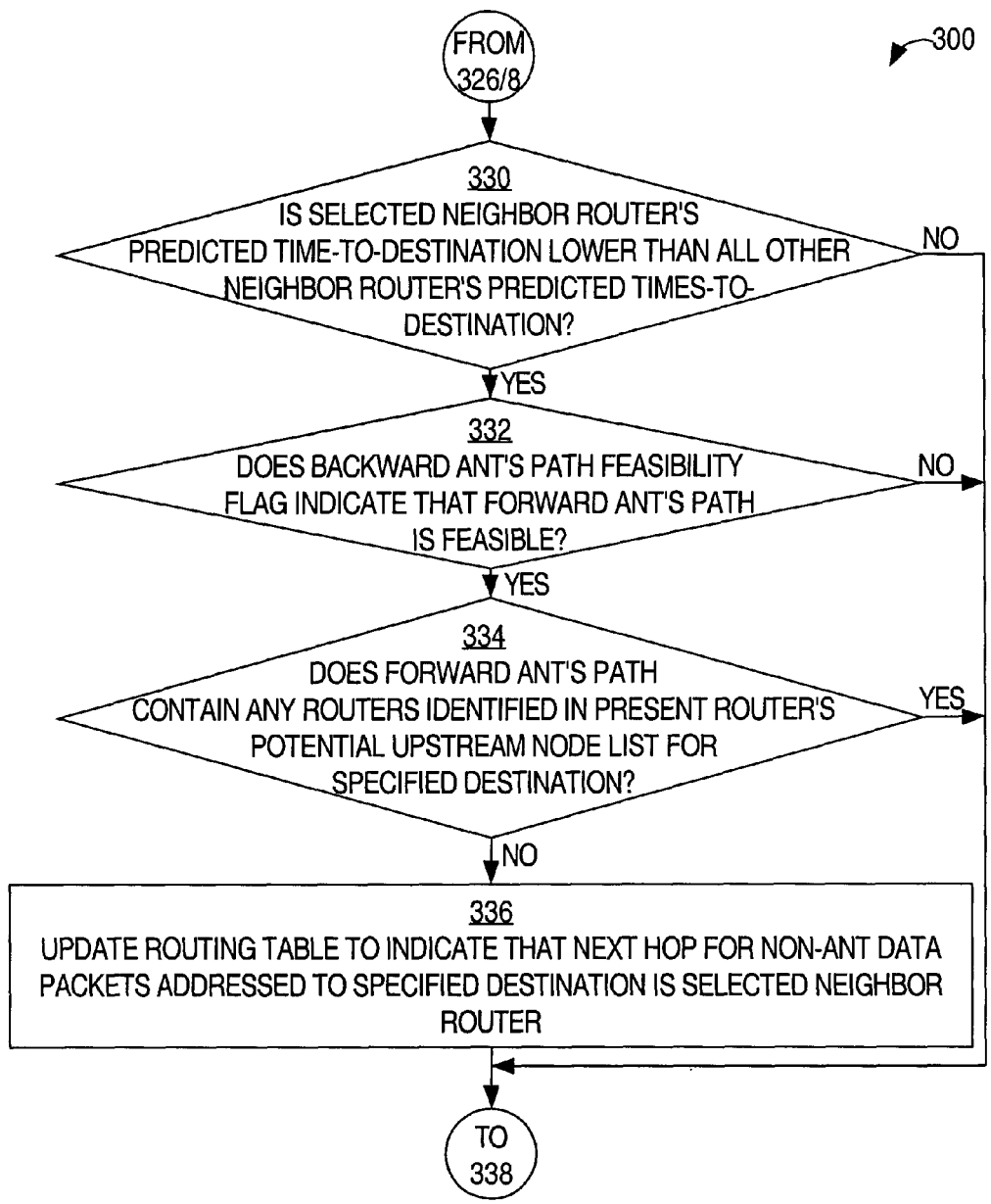
Figure 3E:
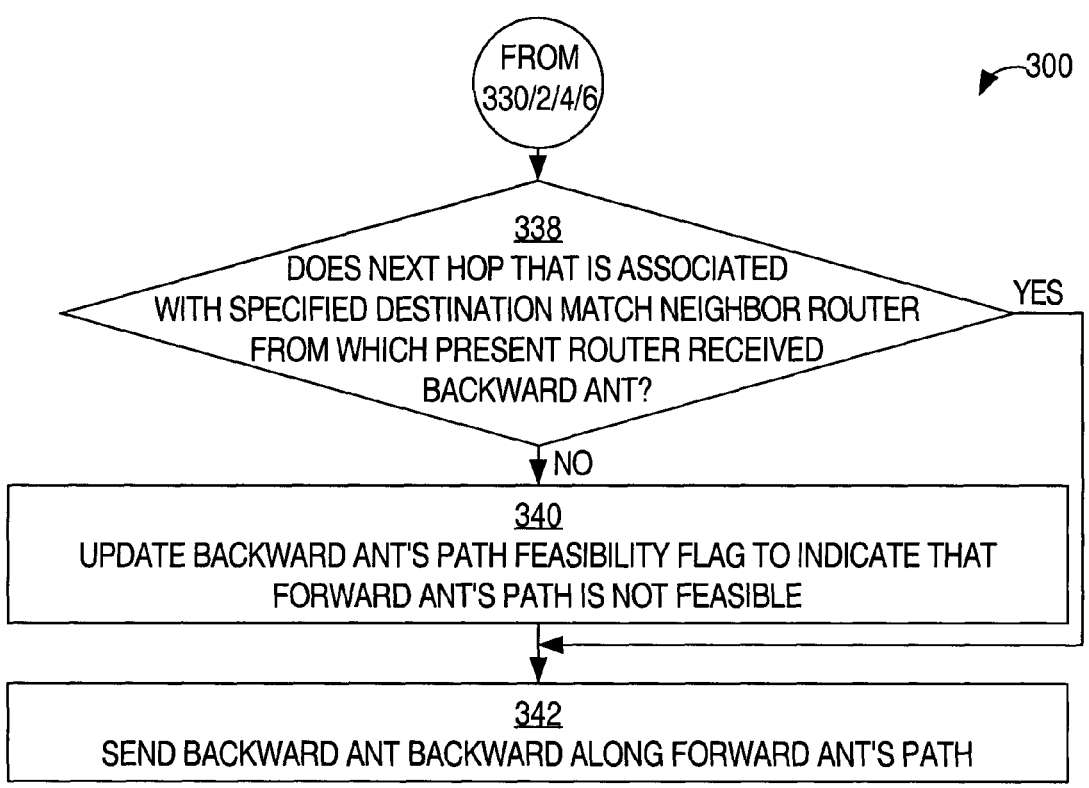

FIG. 2A and FIG. 2B are flow diagrams that illustrate a high level overview of one embodiment of a method 200 of updating a routing table based on an adaptive, deterministic ant routing algorithm. Such a method may be performed by any of many different devices, such as, for example, one or more of routers 102-114 described above.

In block 202, a forward ant is received. For example, router 104 receives a forward ant from router 102, which launched the forward ant. The forward ant specifies router 112 as the forward ant's destination.

In block 204, the forward ant is updated. Continuing the example, router 104 appends, to path information contained in the forward ant, a current timestamp and the identity of router 104.

In block 206, a router is selected from among a set of routers. Each router in the set is associated with a separate amount of time expected to pass between the sending of a data packet toward that router and the arrival of the data packet at the forward ant's destination. The selected router is selected over the other routers because of the selected router's association with the lowest such amount of time. Continuing the example, router 104 selects one of routers 108 and 110 as a next hop for the forward ant. Consulting pheromone table 132, router 104 determines that the amount of time T associated with a path to router 112 through router 108 is lower than the amount of time T associated with a path to router 112 through router 110. In other words, relative to router 112, the pheromone intensity P associated with router 108 is greater than the pheromone intensity P associated with router 110. Consequently, router 104 selects router 108 over router 110.

In block 208, the forward ant is sent to the selected router. Continuing the example, router 104 sends the forward ant to router 108. Each router along the path to router 112 updates the forward ant. The forward ant travels through router 108 and router 110, and arrives at router 112. Router 112 generates a corresponding backward ant and sends the backward ant in the opposite direction over the path indicated by the forward ant.

In block 210, a backward ant is received. The backward ant indicates an amount of time taken for the corresponding forward ant to travel to the forward ant's indicated destination. Continuing the example, the backward ant generated by router 112 travels through router 110 and router 108, and arrives at router 104. The backward ant indicates how long it took for the corresponding forward ant to travel from router 104 to router 112.

In block 212, the amount of time associated with the selected router is updated based on the amount of time indicated by the backward ant. Continuing the example, router 104 updates pheromone table 132. In pheromone table 132, the path to router 112 through router 108 is associated with the amount of time indicated by the backward ant. In other words, $T^k_{di}$ is updated, where d is router 112, i is router 104, and k is router 108. The corresponding $P^k_{di}$ is also updated.

In block 214, a path to the destination through the selected router is updated based on information contained in the backward ant. Continuing the example, router 104 updates the path to router 112 through router 108. Router 104 updates the path to indicate a sequence comprising router 104, router 108, router 110, and router 112 instead of the former sequence comprising router 104, router 108, and router 112. In other words, $PATH^k_{di}$ is updated, where d is router 112, i is router 104, and k is router 108.

In block 216, an indication of an amount of bandwidth available on the path is updated based on information contained in the backward ant. Continuing the example, router 104 updates an amount of bandwidth associated with the path to router 112 through router 118. Router 104 updates the amount to indicate that a maximum of five units of bandwidth is available on the path. This information is indicated in a "bottleneck available bandwidth" field of the backward ant, which is updated at each router that the backward ant visits. In other words, $BW^k_{di}$ is updated, where d is router 112, i is router 104, and k is router 108.

In block 218, an indication of the feasibility of the path taken by the forward ant is updated based on information contained in the backward ant. Continuing the example, router 104 updates a path feasibility flag associated with the path to router 112 through router 118. Router 108 updates the path feasibility flag to indicate, as the backward ant indicates, that the path to router 112 through router 118 is feasible. Thus, $F^k_{di}$ is updated, where d is router 112, i is router 104, and k is router 108.

In block 220, a list of routers in a potential upstream node list is updated based on information contained in the backward ant. The list of routers in the potential upstream node list is updated to indicate all routers in the path taken by the forward ant from (a) the router that originally launched the forward ant to (b) the router that sent the forward ant to the present router. The present router is the router that received the backward ant data packet in block 210 above. Continuing the example, router 104 updates a potential upstream node list associated with router 112. The potential upstream node list is updated to contain router 102, which launched the forward ant and sent the forward ant to router 104. An expiration time associated with the backward ant is associated with router 102 in the potential upstream node list. Thus, $PUN_{di}$ is updated, where d is router 112 and i is router 104.

In block 222, the backward ant is updated to indicate the amount of bandwidth available on the path taken by the backward ant data packet. Continuing the example, router 104 determines that the amount of bandwidth available on the output link from router 104 to router 102 is less than the amount of bandwidth indicated in the backward ant's bottleneck available bandwidth field. Therefore, router 104 updates the backward ant's bottleneck available bandwidth field to indicate the amount of bandwidth available on the output link from router 104 to router 102.

In block 224, the routing table is updated based on information contained in the backward ant. Continuing the example, router 104 determines from the backward ant and pheromone table 132 that the corresponding forward ant's path through router 108 is the most optimal loop-free path to router 112. Therefore, router 104 updates routing table 130 to indicate that the next hop for data packets destined for router 112 is router 108.

In block 226, the backward ant is updated to indicate whether the path taken by the forward ant data packet is feasible. Continuing the example, router 104 determines that routing table 130 indicates that the next hop for data packets destined for router 112 is router 108. From the backward ant's stored path information, router 104 determines that the backward ant was received from router 108. Because the next hop indicated by routing table 130 matches the router from which the backward ant was received, router 104 updates the backward ant's path feasibility flag to indicate that the path taken by the corresponding forward ant is feasible.

In block 228, the backward ant is sent backwards along the forward ant's path. Continuing the example, router 104 sends the backward ant to router 102, which sent the corresponding forward ant to router 104.

The techniques described above are more robust than those employed by other routing protocols. Using the techniques described above, optimal, loop-free paths are discovered even if some ants are eliminated. Furthermore, because the paths are periodically re-evaluated, the techniques described above provide flexibility by rapidly adapting to link failures and network congestion. The techniques described above also are less demanding computationally than some existing routing protocols. In addition, because techniques described above determine the time needed to travel a path based on the actual elapsed time recorded by a forward ant that actually traveled the path, these techniques are more accurate in measuring delay than other approaches. Consequently, the above techniques are more accurate in selecting paths that are associated with the least delay.

3.0 Method of Updating Network Routing Information Based on an Adaptive, Deterministic Ant Routing Algorithm 3.1 Exploring Paths and Updating Routing Information FIG. 3A, FIG. 3B, FIG. 3C, FIG. 3D, and FIG. 3E are flow diagrams that illustrate one embodiment of a method 300 of updating network routing information based on an adaptive, deterministic ant routing algorithm. Such a method may be performed by any of many different devices, such as, for example, one of routers 102-114 described above.

In block 302, each neighbor router in a set of neighbor routers is associated with an amount of time predicted to be required for a data packet to travel to a specified destination if the data packet is transmitted toward that neighbor router. Initially, each neighbor router may be associated with a maximum specified time value representing infinity. In block 304, a forward ant is received. The forward ant indicates a specified destination. In block 306, the forward ant is updated to contain a current timestamp and the identity of the present router.

In block 308, a subset of neighbor routers is selected from the set of neighbor routers such that the subset contains only neighbor routers that the forward ant has not already visited. As described above, routers that the forward ant has already visited are indicated in a list of routers contained in the forward ant.

In block 310, in response to receiving the forward ant, a neighbor router is selected from the subset of neighbor routers. As described above, each neighbor router in the subset is associated with a separate amount of time predicted to pass between the sending of a data packet toward that neighbor router and the arrival of the data packet at the specified destination. The selected neighbor router is selected over the other neighbor routers in the subset because of the selected router's association with the lowest such amount of time among such amounts of time associated with neighbor routers in the subset. However, it is possible that neighbor routers outside of the subset might be associated with lower such amounts of time.

In selecting a neighbor router from the subset of neighbor routers, amounts of time associated with primary paths to the specified destination usually are compared. However, if no primary path information is associated with a particular neighbor router, then an amount of time associated with an alternative path to the specified destination through the particular neighbor router may be used in the comparison instead.

In block 312, it is determined whether any neighbor router outside of the subset is associated with a lower predicted amount of time to the destination than the predicted amount of time associated with the selected neighbor router. If so, then control passes to block 316. Otherwise, control passes to block 314.

In block 314, the forward ant's loop-avoidance router field is updated to indicate the present router. Control passes to block 316.

In block 316, the forward ant is sent to the selected neighbor router. In block 318, a backward ant corresponding to the forward ant is received. The backward ant indicates the amount of time taken for the forward ant to travel to the specified destination.

In block 320, based on an expiration time indicated by the backward ant, it is determined whether the backward ant has expired. If the backward ant has expired, then control passes to block 322. Otherwise, control passes to block 324.

In block 322, the backward ant is eliminated. Alternatively, in block 324, it is determined whether the backward ant's loop-avoidance router field identifies any router that the corresponding forward ant visited after visiting the present router. The backward ant's loop-avoidance router field contains the value that was copied from the corresponding forward ant's loop-avoidance router field. If the backward ant's loop-avoidance router field does not identify any router that the corresponding forward ant visited after visiting the present router, then control passes to block 326. Otherwise, control passes to block 328.

In block 326, pheromone table information regarding the primary path from the present router, through the selected neighbor router, to the specified destination is updated. The amount of time associated with this path is updated based on the amount of time taken for the corresponding forward ant to travel this path, as indicated by the backward ant. Other primary path information also may be updated. Control passes to block 330.

Alternatively, in block 328, pheromone table information regarding an alternative path from the present router, through the selected neighbor router, to the specified destination is updated. Control passes to block 330.

In block 330, it is determined, from the pheromone table, whether the predicted amount of time to reach the specified destination through the selected neighbor router is lower than predicted amounts of time to reach the specified destination through all of the other neighbor routers. If so, then control passes to block 332. Otherwise, control passes to block 338.

In block 332, it is determined whether the backward ant's path feasibility flag indicates that the path taken by the corresponding forward ant is feasible. If so, then control passes to block 334. Otherwise, control passes to block 338.

In block 334, it is determined, from the backward ant's information, whether the path taken by the corresponding forward ant from the present router to the specified destination contains any routers that are identified in the present router's potential upstream node list PUN for the specified destination. If so, then control passes to block 338. Otherwise, control passes to block 336.

In block 336, the routing table is updated to indicate that the next hop for non-ant data packets addressed to the specified destination is the selected neighbor router.

In block 338, it is determined whether the next hop associated with the specified destination in the routing table matches the neighbor router from which the present router received the backward ant. If so, then control passes to block 342. Otherwise, control passes to block 340.

In block 340, the backward ant's path feasibility flag is updated to indicate that the path taken by the corresponding forward ant is not feasible. Control passes to block 342.

In block 342, the backward ant is sent backwards along the forward ant's path, to the neighbor router that sent the corresponding forward ant to the present router.

Figure 4:
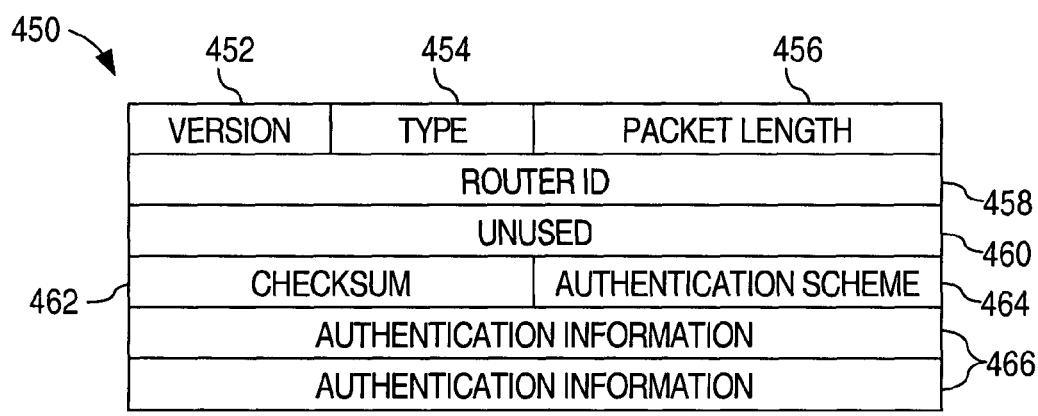
FIG. 4 is a block diagram that illustrates one embodiment of an ant data packet header.

According to one embodiment, each ant is an IP data packet. Each such ant starts with a 24-byte header. FIG. 4 is a block diagram that illustrates one embodiment of an ant data packet header 450. The first byte 452 contains a version number. The second byte 454 contains a type. The type may specify that the ant is a "discovery ant," an "update ant," an "update ant acknowledgement," a "forward ant," or a "backward ant." The third and fourth bytes 456 contain the length of the ant, including the header. The next four bytes 458 identify the router ID of the ant's source. The next four bytes 460 are unused, and set to zero. The next two bytes 462 contain an IP checksum of the contents of the ant, excluding the authentication information described below. The next four bytes 464 identify an authentication procedure to be used when authenticating the ant. The next eight bytes 466 contain authentication information that the specified authentication scheme can use to authenticate the ant.

3.2 Associating Subnets with Destination Routers

Large networks may comprise many subnets. Manually associating each subnet with a destination router would be an onerous task. Moreover, in dynamic networks, routers are almost constantly being added and removed. Such additions and removals may require frequent changes in associations between destination routers and subnets. Manually updating routing information in many routers to reflect correct associations between destination routers and subnets would be nearly impossible in some networks.

Figure 5:
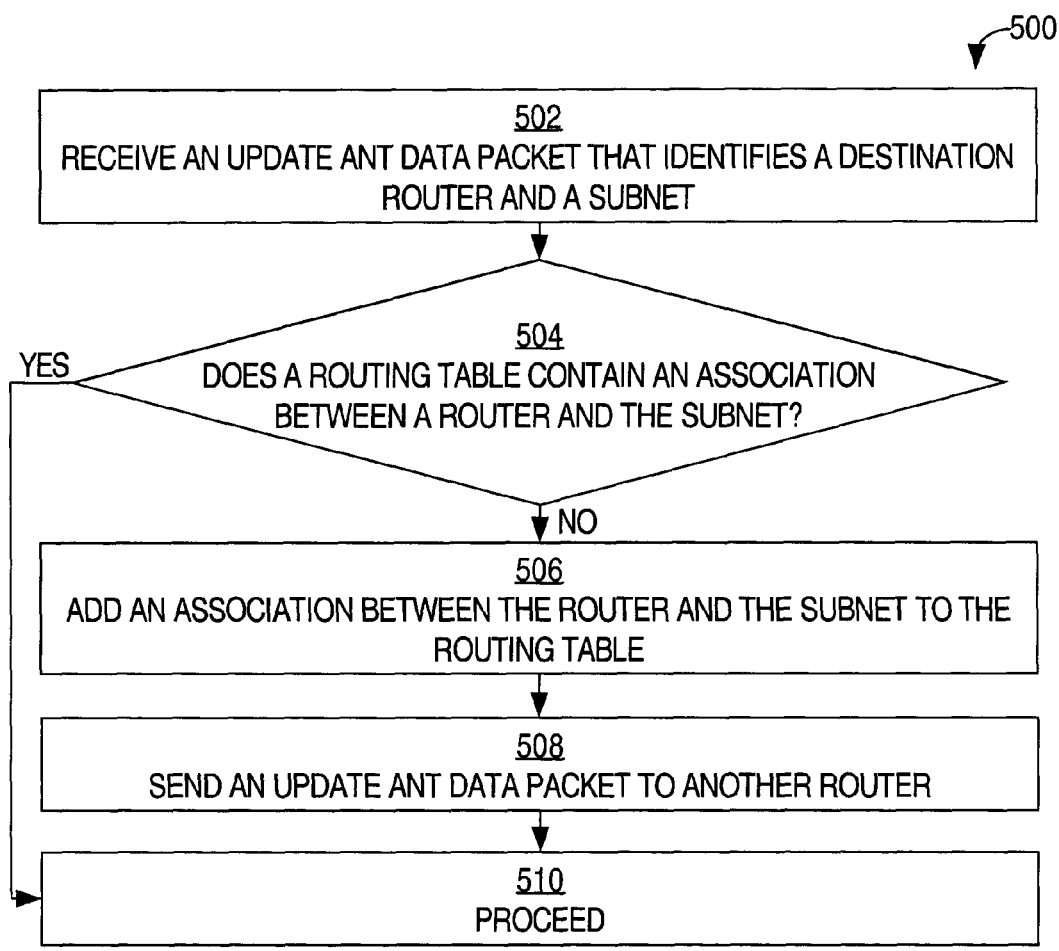
FIG. 5 is a flow diagram that illustrates one embodiment of a process for associating subnets with destination routers.

FIG. 5 is a flow diagram that illustrates one embodiment of a process 500 for associating subnets with destination routers. Such a process may be performed by any of many different devices, such as, for example, one of routers 102-114 described above.

In block 502, an "update ant" data packet is received. Each update ant identifies a destination router and a subnet. For example, router 104 may receive an "update ant" data packet from router 102. The update ant may indicate that router 102 is claiming an association with, or ownership of subnet 116, with which router 102 directly communicates. If only one router is connected to a subnet, and all network traffic to the subnet is transmitted through the router, then the router is said to "own" the subnet. The subnet may be either internal or external to the network of which the router is a part. For example, subnet 116 may be a subnet of network 100, or subnet 116 may be a subnet of a network other than network 100.

In block 504, in response to receiving the update ant, it is determined whether a routing table contains an association between a router and the subnet. Continuing the example, in response to receiving the update ant, router 104 may determine whether routing table 130 contains an association between any router and subnet 116. If the routing table does not contain an association between a router and the subnet, then control passes to block 506. Otherwise, control passes to block 510.

In block 506, an association between the destination router and the subnet is added to the routing table. For example, if router 104 determines that routing table 130 does not yet contain an association between any router and subnet 116, then router 104 may add an association between router 102 and subnet 116 to routing table 130.

In block 508, an update ant is sent to another router. For example, router 104 may transmit the update ant to routers 108 and 110 so that routers 108 and 110 may also update their routing tables. According to one embodiment, whenever a router updates its routing information according to "newly learned" information, it propagates the newly learned information to other routers in the network, as in blocks 506-508. In this way, every router in a network may rapidly learn about changes in the network's topology and automatically update its local routing information accordingly.

In block 510, the device that performs process 500 proceeds to function according to the device's configuration. By establishing which destination router "owns" a particular subnet, forward ants may be sent to destination routers only, rather than every network device in a network. This reduces the overhead involved in updating routing information.

According to one embodiment, each update ant contains a sequence of <type, length, value> triplets, where each triplet represents a particular type of router information. Some of the different types of router information are router ID information, neighbor information, internal subnet information, and external subnet information.

Router ID information may comprise two separate items. One item is the identity of the router to which the information in the update ant refers. The other item is the identity of the router that generated the update ant. These items may be the same. However, if the update information refers to a virtual router, then the router that generated the update ant is a router that acts as a proxy router for the virtual router. Virtual routers and proxy routers are described in greater detail below.

Neighbor information may comprise a list of routers that are directly connected to the router to which the information in the update ant refers. A particular neighbor router's ID, such as the neighbor router's loopback IP address, may identify a particular neighbor router. Neighbor information may convey changes in network topology.

Internal subnet information comprises a list of internal subnets that a router owns. Internal subnets are subnets within the same autonomous system as the router that owns the subnets. Routers within the same autonomous system typically use the same routing protocol. A separate subnet number and subnet mask may represent each internal subnet.

External subnet information comprises a list of external subnets that a router owns. External subnets are subnets that are not within the same autonomous system as the router that owns the subnets. Routers within different autonomous systems may use different routing protocols. A separate subnet number, subnet mask, metric type, and metric value may represent each external subnet. Metric types and metric values are described in greater detail below.

According to one embodiment, whenever a particular router discovers a new neighbor router, the particular router sends all of the particular router's routing information in an update ant to the new neighbor router. Thereafter, the particular router sends incrementally updated information to the neighbor router when the particular router's routing information changes.

For example, when a router determines that a link to a particular subnet can no longer be used to transmit data packets to the particular subnet, the router may send an update ant that indicates that the link can no longer be used. When neighbor routers receive the update ant, the neighbor routers can update their routing information so that data packets no longer will be transmitted through a network route that includes the unusable link.

In one embodiment, when a particular router no longer has any neighbors, such as when the particular router fails, then each other router removes the particular router from its routing information, such as its pheromone table and routing table.

According to one embodiment, when a particular router receives an update ant from another router, the particular router sends an update ant acknowledgement data packet to the other router in response. If a particular router sends an update ant to another router and does not receive an update ant acknowledgement data packet from the other router within a specified period of time, then the particular router retransmits the update ant to the other router.

3.3 Determining Neighbor Routers

As described above, a particular router may update its routing information based on an update ant that is received from another router. The other router might have sent the update ant in response to a change in the other router's routing information. Alternatively, the other router might have sent the update ant in response to receiving a "discovery ant" data packet from the particular router. According to one embodiment, each router in an autonomous system broadcasts a discovery ant through each of that router's outgoing ports at specified intervals of time, such as every 10 seconds. Periodically transmitted discovery ants serve as a sort of "heartbeat" of a particular router by which other routers may discover the addition or removal of the particular router from a network.

Figure 6:
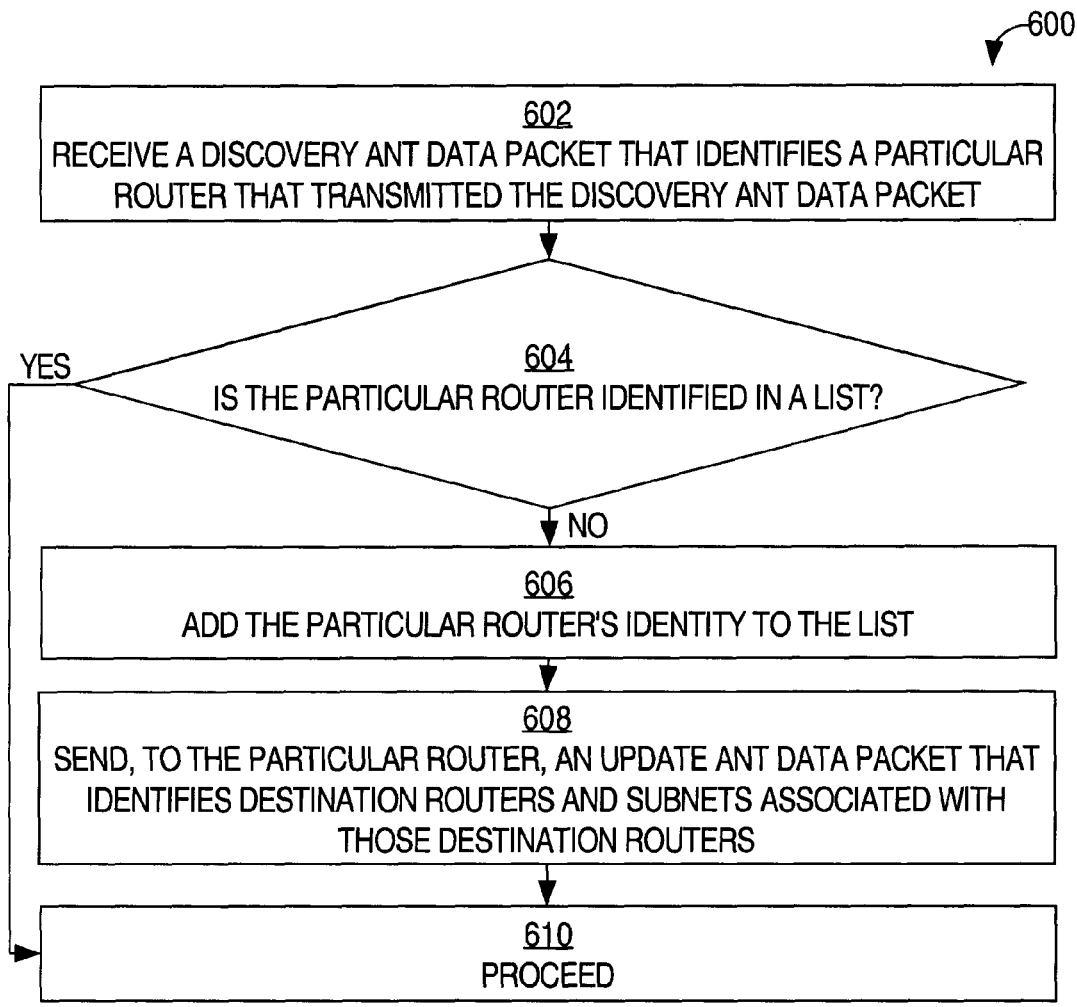
FIG. 6 is a flow diagram that illustrates one embodiment of a process for discovering a router.

FIG. 6 is a flow diagram that illustrates one embodiment of a process 600 for discovering a router. Such a process may be performed by any of many different devices, such as, for example, one of routers 102-114 described above.

In block 602, a discovery ant is received. The discovery ant identifies a particular router that transmitted the discovery ant. For example, router 104 may receive a discovery ant that identifies router 102 as the sender. In one embodiment, the discovery ant specifies a time-to-live of 1, so that routers that receive a broadcasted discovery ant will not retransmit the discovery ant.

In block 604, in response to receiving the discovery ant, it is determined whether the particular router is identified in a list. For example, router 104 may determine whether router 102 is identified in a neighbor router list that router 104 maintains. Router 104 may determine whether router 102 is associated with any subnet in routing table 130. If the particular router is not identified in the list, then control passes to block 606. Otherwise, control passes to block 610.

In block 606, the particular router's identity is added to the list. For example, router 104 may add router 102's identity to a neighbor router list that router 104 maintains. Router 104 may add router 102's identity to routing table 130.

In block 608, an update ant is sent to the particular router. The update ant identifies destination routers and subnets associated with those destination routers. For example, router 104 may send an update ant to router 102. The update ant may contain all of router 104's routing information, including all of the information in pheromone table 132.

In block 610, the device that performs process 600 proceeds to function according to the device's configuration. Thus, characteristics of each router in a network may be automatically "learned" by each other router in a network. This allows the sending of forward ants to many destination routers in a large, dynamic network without manually specifying every destination router in a network.

3.4 Detecting and Responding to Link Failures and Router Removals

Figure 7:
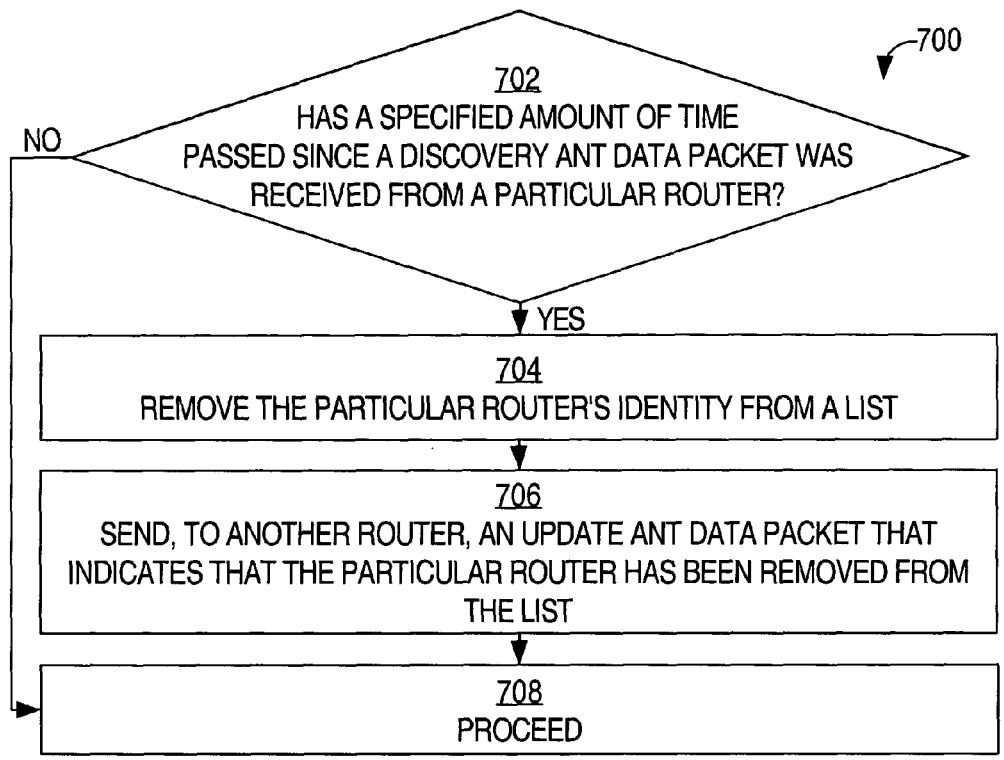
FIG. 7 is a flow diagram that illustrates one embodiment of a process for discovering that a router has been removed from a network.

In a large, dynamic network, routers are often frequently removed. Links between routers sometimes fail. Automatically discovering router removals and link failures helps remaining routers to update their routing information quickly so that any interruption in network traffic is minimized. FIG. 7 is a flow diagram that illustrates one embodiment of a process 700 for discovering that a router has been removed from a network. Such a process may be performed by any of many different devices, such as, for example, one of routers 102-114 described above.

In block 702, it is determined whether a specified amount of time has passed since a discovery ant was received from a particular router. For example, router 102 may maintain, for each neighbor router in router 102's list of neighbor routers, a separate timestamp that can be used to determine elapsed time since a discovery ant was received from that neighbor router. Whenever router 102 receives a discovery ant from a neighbor router, router 102 updates the timestamp for that neighbor router. If each router in network 100 is configured to broadcast a discovery ant packet every N seconds, and at least M·N seconds has passed since router 102 has received a discovery ant from router 106, then router 102 may determine that at least M consecutive discovery ants have not been received from router 106. If M is greater than a specified threshold, then router 102 may conclude that router 106 has been removed from network 100. If a specified amount of time has passed since a discovery ant was received from a particular router, then control passes to block 704. In other words, if a specified consecutive number of discovery ants have not been received from a particular router, then control passes to block 704. Otherwise, control passes to block 708.

In block 704, the particular router's identity is removed from a list. Continuing the example, router 102 may remove router 106's identity from a list of router 102's neighbor routers. Router 102 may remove, from a routing table that router 102 maintains, an association between router 106 and subnet 120.

In block 706, an update ant is sent to another router. The update ant indicates that the particular router has been removed from the list. Continuing the example, router 102 may send, to router 104, an update ant that indicates that router 106 has been removed from network 100. In block 708, the device that performs process 700 proceeds.

Figure 8:
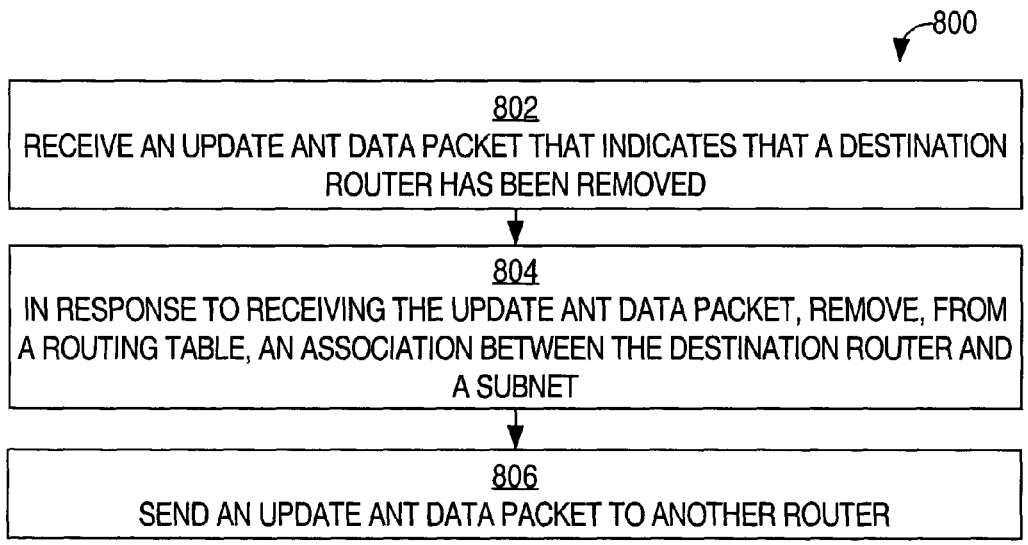
FIG. 8 is a flow diagram that illustrates one embodiment of a process for removing an association between a destination router and a subnet.

Because a router sends an update ant to the router's neighbor routers whenever the router's routing information changes, removal information may be rapidly propagated to every other router in the network. FIG. 8 is a flow diagram that illustrates one embodiment of a process 800 for removing an association between a destination router and a subnet. Such a process may be performed by any of many different devices, such as, for example, one of routers 102-114 described above.

In block 802, an update ant is received. The update ant indicates that a destination router has been removed. For example, router 104 may receive an update ant that indicates that router 106 has been removed from router 102's list of neighbor routers.

In block 804, an association between the destination router and a subnet is removed from a routing table in response to receiving the update ant. Continuing the example, in response to receiving the update ant, router 104 may remove an association between router 106 and subnet 120 from routing table 130.

In block 806, an update ant is sent to another router. Continuing the example, router 104 may forward the update ant to routers 108 and 110. Because each router sends an update ant to that router's neighbors whenever that router's routing information changes, each router in network 100 automatically receives information indicating removal of router 106 and can update locally maintained routing information accordingly.

Unlike other routing protocols, such as those that use the Bellman-Ford algorithm, techniques described herein do not suffer from the "count-to-infinity" problem when a link fails. This is due in part to the fact that, according to the techniques described herein, old paths simply time-out unless backward ants return from a destination to which corresponding forward ants were sent. Both update ants and the end-to-end path information stored in pheromone tables contribute to rapid convergence.

3.5 Associating a Subnet with a Virtual Destination Router

Multiple routers may be directly connected to network devices in the same subnet, and data packets destined for network devices in the subnet may be transmitted though any of a plurality of routers that are so connected. According to one embodiment, a subnet that would be associated with multiple destination routers in a routing table is associated with a single virtual router instead. The virtual router is information that represents and appears to be an actual router with the virtual router's identity. The virtual router's network address may be the subnet address of the subnet with which the virtual router is associated. The multiple destination routers that otherwise would have been associated with the subnet may act as proxy routers for the virtual router. Each proxy router is configured to detect forward ants that are destined for the virtual router, and to generate corresponding backward ants. Other routers may send forward ants to a virtual router in the same manner that those other routers would send forward ants to an actual router. Each proxy router is also configured to periodically transmit, to other routers, forward ants that identify the virtual router as the forward ant's originator.

Figure 9:
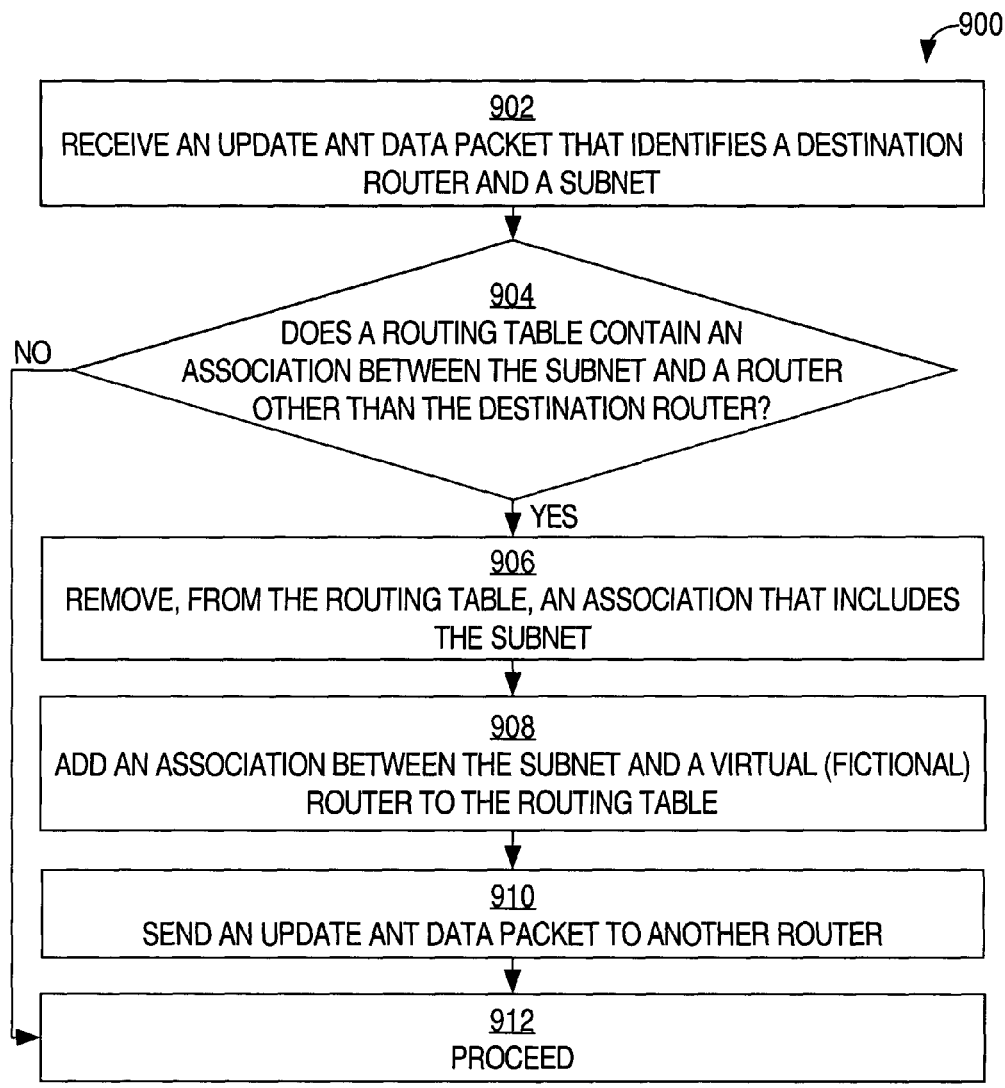
FIG. 9 is a flow diagram that illustrates one embodiment of a process for associating a subnet with a virtual destination router.

FIG. 9 is a flow diagram that illustrates one embodiment of a process 900 for associating a subnet with a virtual destination router. Such a process may be performed by any of many different devices, such as, for example, one of routers 102-114 described above.

In block 902, an update ant is received. The update ant identifies a destination router and a subnet. For example, router 104 may receive an update ant that indicates that router 114 claims ownership of subnet 126. The subnet may be an external subnet.

In block 904, in response to receiving the update ant, it is determined whether a routing table contains an association between the subnet and a router other than the destination router. Continuing the example, router 104 may determine whether routing table 130 contains an association between subnet 126 and any router other than router 114. If the routing table contains an association between the subnet and a router other than the destination router, then control passes to block 906. Otherwise, control passes to block 912.

In block 906, an association that includes the subnet is removed from the routing table. Continuing the example, router 104 may remove an association between router 112 and subnet 126 from routing table 130. Router 104 may remove, from routing table 130, each association between any router and subnet 126.

In block 908, an association between the subnet and a virtual (fictional) destination router is added to the routing table. Continuing the example, router 104 may add an association between subnet 126 and a virtual router to routing table 130. The virtual router may be identified by subnet 126's subnet address. Thereafter, routers 112 and 114 are configured to act as proxy routers for the virtual router. Routers 112 and 114 may maintain data structures that indicate that routers 112 and 114 are to generate backward ants upon receiving corresponding forward ants that are destined for the virtual router.

In block 910, an update ant is sent to another router. Continuing the example, router 104 may send an update ant to routers 102, 108, and 110. The update ant may indicate an association between subnet 126 and the virtual router that was added to routing table 130.

In block 912, the device that performs process 900 proceeds to function according to the device's configuration. Associating subnets with virtual routers greatly reduces the overhead required to update routing information, decreases the size of routing information, and hastens the selection of network routes.

3.6 Advertising External Routes

Routers that are external to an autonomous system might be configured to use a different routing protocol than that used within the autonomous system. When routing information that relates to links within an external subnet is being updated, the updated routing information should account for the quality of portions of network routes that occur outside of the autonomous system. One way of accounting for the quality of such portions is through external route advertising.

According to one embodiment, update ants that carry external route advertisements for each external route are flooded throughout an autonomous system, such as network 100. The router that owns an external subnet generated the update ants that carry the external route advertisements for routes in the external subnet. As in OSPF, the external route cost metric that is advertised for a particular external route may be one of two types. Type 1 metrics are comparable to the cost of an intra-autonomous system route. Type 2 metrics are assumed to be larger than the cost of any intra-autonomous system route. Routers that own external subnets translate an external route cost metric that is advertised according to a protocol, such as Border Gateway Protocol, into an additional time delay indicated by the forward ants. As a result, router-probability associations may be updated based on the external route cost metric. Border Gateway Protocol ("BGP") is described in IETF RFC 1771.

The exchange rate between the external route cost metric and the time delay value may be specified and adjusted according to a heuristic approach. The cost of an intra-autonomous system route, or path, is evaluated based on the quality of the links through which the forward ants were transmitted.

When more than one router is connected to an external subnet, an association between the external subnet and a virtual router may be added to routing tables. The virtual link quality specified by the proxy routers for the virtual router may be based on the external route cost metric. If the external route cost metric is Type 1, then the virtual router's ID and the virtual link quality are pushed to other routers through forward ants. If the external route cost metric is Type 2, then the proxy router that advertises the smallest external route metric value transmits a backward ant in which a very small delay has been factored into the link quality, and the other proxy routers send backward ants in which a maximum delay has been factored into the link quality.

4.0 Implementation Mechanisms—Hardware Overview

Figure 10:
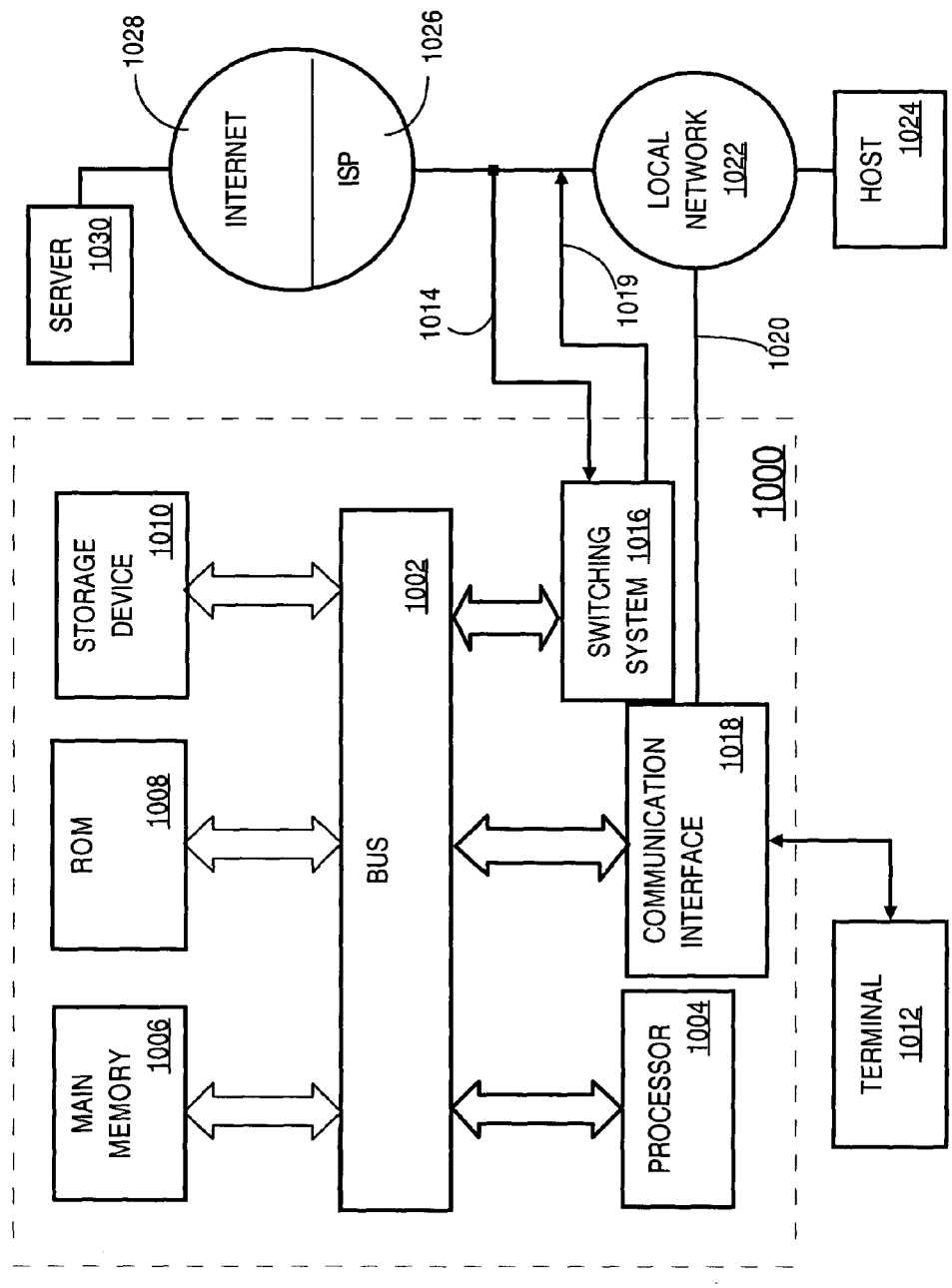
FIG. 10 is a block diagram that illustrates a computer system upon which an embodiment may be implemented.

FIG. 10 is a block diagram that illustrates a computer system 1000 upon which an embodiment of the invention may be implemented. The preferred embodiment is implemented using one or more computer programs running on a network element such as a router device. Thus, in this embodiment, the computer system 1000 is a router.

Computer system 1000 includes a bus 1002 or other communication mechanism for communicating information, and a processor 1004 coupled with bus 1002 for processing information. Computer system 1000 also includes a main memory 1006, such as a random access memory (RAM), flash memory, or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk, flash memory or optical disk, is provided and coupled to bus 1002 for storing information and instructions.

A communication interface 1018 may be coupled to bus 1002 for communicating information and command selections to processor 1004. Interface 1018 is a conventional serial interface such as an RS-232 or RS-422 interface. An external terminal 1012 or other computer system connects to the computer system 1000 and provides commands to it using the interface 1014. Firmware or software running in the computer system 1000 provides a terminal interface or character-based command interface so that external commands can be given to the computer system.

A switching system 1016 is coupled to bus 1002 and has an input interface 1014 and an output interface 1019 to one or more external network elements. The external network elements may include a local network 1022 coupled to one or more hosts 1024, or a global network such as Internet 1028 having one or more servers 1030. The switching system 1016 switches information traffic arriving on input interface 1014 to output interface 1019 according to pre-determined protocols and conventions that are well known. For example, switching system 1016, in cooperation with processor 1004, can determine a destination of a packet of data arriving on input interface 1014 and send it to the correct destination using output interface 1019. The destinations may include host 1024, server 1030, other end stations, or other routing and switching devices in local network 1022 or Internet 1028.

The invention is related to the use of computer system 1000 for updating a routing table based on an adaptive, deterministic ant routing algorithm. According to one embodiment of the invention, computer system 1000 provides for such updating in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Communication interface 1018 also provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for updating a routing table based on an adaptive, deterministic ant routing algorithm as described herein.

Processor 1004 may execute the received code as it is received and/or stored in storage device 1010 or other non-volatile storage for later execution. In this manner, computer system 1000 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of updating a routing table, the method comprising the computer-implemented steps of:
    sending a first data packet to a particular router, wherein the particular router is always selected only from a set of routers that the first data packet has not already visited;
    wherein the particular router is associated with a first actual time that is a shortest time among all times associated with routers in the set of routers;
    wherein the first actual time has been updated with a previous actual time taken for a previous data packet to travel to a previous destination indicated by the previous data packet;
    receiving a second data packet that indicates a second actual time taken for the first data packet to travel to a destination indicated by the first data packet;
    wherein the destination indicated by the first data packet is the same as the previous destination indicated by the previous data packet;
    wherein the second data packet is sent from the destination indicated by the first data packet;
    updating the first actual time based on the second actual time; and
    updating the routing table based on information contained in the second data packet;
    wherein the method is performed by one or more computing devices.

2. The method of claim 1, further comprising:
    updating, based on information contained in the second data packet, a path associated with both the destination and the particular router.

3. The method of claim 1, further comprising:
    updating, based on information contained in the second data packet, an indication of an amount of bandwidth available on a path taken by the second data packet.

4. The method of claim 1, further comprising:
    updating, based on information contained in the second data packet, an indication of whether a path taken by the first data packet is feasible.

5. The method of claim 1, further comprising:
    updating, based on information contained in the second data packet, a list of routers that indicates all routers in a path taken by the first data packet from a router that sent the first data packet to a present router.

6. The method of claim 1, further comprising:
    updating the second data packet to indicate an amount of bandwidth available on a path taken by the second data packet.

7. The method of claim 1, further comprising:
    based on information in the second data packet, updating the second data packet to indicate that a path taken by the first data packet is not feasible.

8. A method of updating a routing table, the method comprising the computer-implemented steps of:
    for each neighbor router in a set of neighbor routers, associating the neighbor router with an amount of time predicted to be required for a data packet to travel to a specified destination if the data packet is transmitted through the neighbor router;
    receiving a first data packet that indicates the specified destination;
    in response to receiving the first data packet, selecting, from the set of neighbor routers, a particular neighbor router that is associated with a first amount of actual time that is a lowest amount of time, relative to the specified destination, among amounts of time associated with neighbor routers in the set of neighbor routers;
    wherein the selected neighbor router is never in the list of routers previously visited by the first data packet;
    wherein the lowest amount of time has been updated with a previous amount of actual time taken for a previous data packet to travel to the specified destination;
    sending the first data packet to the particular neighbor router;
    receiving a second data packet that indicates a second amount of actual time taken for the first data packet to travel to the specified destination;
    wherein the second data packet is sent from the specified destination;
    updating, based on the second amount of actual time, the first amount of actual time; and
    updating, based on information contained in the second data packet, the routing table;
    wherein the method is performed by one or more computing devices.

9. A method of updating a routing table, the method comprising the computer-implemented steps of:
    for each neighbor router in a set of neighbor routers, associating the neighbor router with an amount of time predicted to be required for a data packet to travel to a specified destination if the data packet is transmitted through the neighbor router;
    receiving a forward ant data packet that indicates the specified destination;
    selecting, based on one or more first specified criteria, a subset of the set of neighbor routers;
    in response to receiving the forward ant data packet, selecting, from the subset of neighbor routers, a particular neighbor router that is associated with a first amount of actual time that is a lowest amount of time, relative to the specified destination, among amounts of time associated with neighbor routers in the subset of neighbor routers;
    wherein the one or more first specified criteria comprise a criterion that no neighbor router in the subset of neighbor routers is in a list of routers already visited by the forward ant data packet;

wherein the lowest amount of time has been updated with a previous amount of actual time taken for a previous data packet to travel to the specified destination;
sending the forward ant data packet to the particular neighbor router;
receiving a backward ant data packet that indicates a second amount of actual time taken for the forward ant data packet to travel to the specified destination;
wherein the backward ant data packet is sent from the specified destination;
determining, based on information indicated in the backward ant data packet, whether one or more second specified criteria are satisfied; and
if the one or more second specified criteria are satisfied, then performing steps comprising:
  updating, based on the second amount of actual time, the first amount of actual time; and
  if one or more third specified criteria are satisfied, then updating, based on information indicated in the backward ant data packet, the routing table;
wherein the method is performed by one or more computing devices.

10. The method of claim 9, further comprising:
determining whether any neighbor router in the set of neighbor routers is associated with an amount of time that is lower than the first amount of actual time; and
if any neighbor router in the set of neighbor routers is associated with an amount of time that is lower than the first amount of actual time, then updating the forward ant data packet to indicate a present router in a loop-avoidance router field of the forward ant data packet.

11. The method of claim 10, wherein a loop-avoidance router field of the backward ant data packet indicates a router indicated by the loop-avoidance router field of the forward ant data packet.

12. The method of claim 11, wherein the one or more second specified criteria comprise a criterion that the router indicated by the loop-avoidance router field of the backward ant data packet is not contained in a list of routers that the forward ant visited after visiting a present router.

13. The method of claim 9, wherein the one or more third specified criteria comprise a criterion that the second amount of actual time is lower than any other amount of time, relative to the specified destination, among amounts of time associated with neighbor routers in the set of neighbor routers.

14. The method of claim 9, further comprising:
determining whether a router from which the backward ant data packet was received matches a router associated with the destination in the routing table; and
if the router from which the backward ant data packet was received does not match the router associated with the destination in the routing table, then updating a path feasibility flag of the backward ant to indicate that a path taken by the forward ant is not feasible.

15. The method of claim 14, wherein the one or more third specified criteria comprise a criterion that the path feasibility flag of the backward ant indicates that the path taken by the forward ant is feasible.

16. The method of claim 9, wherein the one or more third specified criteria comprise a criterion that a path taken by the forward ant data packet from a present router to the specified destination does not include any routers that are identified in a potential upstream node list.

17. A non-transitory computer-readable medium storing one or more sequences of instructions for updating a routing table, which instructions, when executed by one or more processors, cause the one or more processors to carry out the steps of:
sending a first data packet to a particular router, wherein during the method the particular router is always selected only from a set of routers that the first data packet has not already visited;
wherein the particular router is associated with a first actual time that is a shortest time among all times associated with routers in the set of routers;
selecting, from a set of routers, a particular router that is associated with a first actual time that is a shortest time among all times associated with routers in the set of routers;
wherein the first actual time has been updated with a previous actual time taken for a previous data packet to travel to a previous destination indicated by the previous data packet;
receiving a second data packet that indicates a second actual time taken for the first data packet to travel to a destination indicated by the first data packet;
wherein the destination indicated by the first data packet is the same as the previous destination indicated by the previous data packet;
wherein the second data packet is sent from the destination indicated by the first data packet;
updating, based on the second actual time, the first actual time; and
updating, based on information contained in the second data packet, the routing table.

18. An apparatus for updating a routing table, comprising:
a network interface that is coupled to a data network for receiving one or more packet flows therefrom;
a processor;
one or more stored sequences of instructions which, when executed by the processor, cause the processor to carry out the steps of:
sending a first data packet to a particular router, wherein during the method the particular router is always selected only from a set of routers that the first data packet has not already visited;
wherein the particular router is associated with a first actual time that is a shortest time among all times associated with routers in the set of routers;
wherein the first actual time has been updated with a previous actual time taken for a previous data packet to travel to a previous destination indicated by the previous data packet;
receiving a second data packet that indicates a second actual time taken for the first data packet to travel to a destination indicated by the first data packet;
wherein the destination indicated by the first data packet is the same as the previous destination indicated by the previous data packet;
wherein the second data packet is sent from the destination indicated by the first data packet;
updating, based on the second actual time, the first actual time; and
updating, based on information contained in the second data packet, the routing table.

19. The apparatus of claim 18, wherein the stored sequences of instructions include instructions which, when executed by the processor, cause the processor to further carry out:
updating, based on information contained in the second data packet, a path associated with both the destination and the particular router.

20. The apparatus of claim 18, wherein the stored sequences of instructions include instructions which, when executed by the processor, cause the processor to further carry out:
  updating, based on information contained in the second data packet, an indication of an amount of bandwidth available on a path taken by the second data packet.

21. The apparatus of claim 18, wherein the stored sequences of instructions include instructions which, when executed by the processor, cause the processor to further carry out:
  updating, based on information contained in the second data packet, an indication of whether a path taken by the first data packet is feasible.

22. The apparatus of claim 18, wherein the stored sequences of instructions include instructions which, when executed by the processor, cause the processor to further carry out:
  updating, based on information contained in the second data packet, a list of routers that indicates every router in a path taken by the first data packet from a router that sent the first data packet to a present router.

23. The apparatus of claim 18, wherein the stored sequences of instructions include instructions which, when executed by the processor, cause the processor to further carry out:
  updating the second data packet to indicate an amount of bandwidth available on a path taken by the second data packet.

24. The non-transitory computer-readable medium of claim 17, the instructions further comprising instructions, which when executed, cause the one or more processors to perform updating, based on information contained in the second data packet, a path associated with both the destination and the particular router.

25. The non-transitory computer-readable medium of claim 17, the instructions further comprising instructions, which when executed, cause the one or more processors to perform updating, based on information contained in the second data packet, an indication of an amount of bandwidth available on a path taken by the second data packet.

26. The non-transitory computer-readable medium of claim 17, the instructions further comprising instructions, which when executed, cause the one or more processors to perform updating, based on information contained in the second data packet, an indication of whether a path taken by the first data packet is feasible.

27. The non-transitory computer-readable medium of claim 17, the instructions further comprising instructions, which when executed, cause the one or more processors to perform updating, based on information contained in the second data packet, a list of routers that indicates all routers in a path taken by the first data packet from a router that sent the first data packet to a present router.

28. The non-transitory computer-readable medium of claim 17, the instructions further comprising instructions, which when executed, cause the one or more processors to perform updating the second data packet to indicate an amount of bandwidth available on a path taken by the second data packet.

29. The non-transitory computer-readable medium of claim 17, the instructions further comprising instructions, which when executed, cause the one or more processors to perform based on information in the second data packet, updating the second data packet to indicate that a path taken by the first data packet is not feasible.

30. A non-transitory computer-readable medium storing one or more sequences of instructions, which when executed, cause one or more processors to perform:
  for each neighbor router in a set of neighbor routers, associating the neighbor router with an amount of time predicted to be required for a data packet to travel to a specified destination if the data packet is transmitted through the neighbor router;
  receiving a first data packet that indicates the specified destination;
  in response to receiving the first data packet, selecting, from the set of neighbor routers, a particular neighbor router that is associated with a first amount of actual time that is a lowest amount of time, relative to the specified destination, among amounts of time associated with neighbor routers in the set of neighbor routers;
  wherein the selected neighbor router is never in the list of routers previously visited by the first data packet;
  wherein the lowest amount of time has been updated with a previous amount of actual time taken for a previous data packet to travel to the specified destination;
  sending the first data packet to the particular neighbor router;
  receiving a second data packet that indicates a second amount of actual time taken for the first data packet to travel to the specified destination;
  wherein the second data packet is sent from the specified destination;
  updating, based on the second amount of actual time, the first amount of actual time;
  updating, based on information contained in the second data packet, the routing table.

31. A non-transitory computer-readable medium storing one or more sequences of instructions, which when executed, cause one or more processors to perform:
  for each neighbor router in a set of neighbor routers, associating the neighbor router with an amount of time predicted to be required for a data packet to travel to a specified destination if the data packet is transmitted through the neighbor router;
  receiving a forward ant data packet that indicates the specified destination;
  selecting, based on one or more first specified criteria, a subset of the set of neighbor routers;
  in response to receiving the forward ant data packet, selecting, from the subset of neighbor routers, a particular neighbor router that is associated with a first amount of actual time that is a lowest amount of time, relative to the specified destination, among amounts of time associated with neighbor routers in the subset of neighbor routers;
  wherein the one or more first specified criteria comprise a criterion that no neighbor router in the subset of neighbor routers is in a list of routers already visited by the forward ant data packet;
  wherein the lowest amount of time has been updated with a previous amount of actual time taken for a previous data packet to travel to the specified destination;
  sending the forward ant data packet to the particular neighbor router;
  receiving a backward ant data packet that indicates a second amount of actual time taken for the forward ant data packet to travel to the specified destination;
  wherein the backward ant data packet is sent from the specified destination;
  determining, based on information indicated in the backward ant data packet, whether one or more second specified criteria are satisfied;

if the one or more second specified criteria are satisfied, then performing steps comprising:
    updating, based on the second amount of actual time, the first amount of actual time; and
    if one or more third specified criteria are satisfied, then updating, based on information indicated in the backward ant data packet, the routing table.

32. The non-transitory computer-readable medium of claim 31, the instructions further comprising instructions which when executed cause the one or processors to perform:
    determining whether any neighbor router in the set of neighbor routers is associated with an amount of time that is lower than the first amount of actual time; and
    if any neighbor router in the set of neighbor routers is associated with an amount of time that is lower than the first amount of actual time, then updating the forward ant data packet to indicate a present router in a loop-avoidance router field of the forward ant data packet.

33. The non-transitory computer-readable medium of claim 32, wherein a loop-avoidance router field of the backward ant data packet indicates a router indicated by the loop-avoidance router field of the forward ant data packet.

34. The non-transitory computer-readable medium of claim 33, wherein the one or more second specified criteria comprise a criterion that the router indicated by the loop-avoidance router field of the backward ant data packet is not contained in a list of routers that the forward ant visited after visiting a present router.

35. The non-transitory computer-readable medium of claim 31, wherein the one or more third specified criteria comprise a criterion that the second amount of actual time is lower than any other amount of time, relative to the specified destination, among amounts of time associated with neighbor routers in the set of neighbor routers.

36. The non-transitory computer-readable medium of claim 31, the instructions further comprising instructions which when executed cause the one or processors to perform:
    determining whether a router from which the backward ant data packet was received matches a router associated with the destination in the routing table; and
    if the router from which the backward ant data packet was received does not match the router associated with the destination in the routing table, then updating a path feasibility flag of the backward ant to indicate that a path taken by the forward ant is not feasible.

37. The non-transitory computer-readable medium of claim 36, wherein the one or more third specified criteria comprise a criterion that the path feasibility flag of the backward ant indicates that the path taken by the forward ant is feasible.

38. The non-transitory computer-readable medium of claim 31, wherein the one or more third specified criteria comprise a criterion that a path taken by the forward ant data packet from a present router to the specified destination does not include any routers that are identified in a potential upstream node list.

* * * * *

UNITED STATES PATENT AND TRADEMARK OFFICE
CERTIFICATE OF CORRECTION

| | |
|---|---|
| PATENT NO. | : 8,018,953 B1 |
| APPLICATION NO. | : 10/645255 |
| DATED | : September 13, 2011 |
| INVENTOR(S) | : Zhao |

It is certified that error appears in the above-identified patent and that said Letters Patent is hereby corrected as shown below:

In the claims:

COLUMN 24

Claim 17, line 5, delete "during the method"

Claim 18, line 39, delete "during the method"

Signed and Sealed this
Twenty-second Day of November, 2011

David J. Kappos
*Director of the United States Patent and Trademark Office*